(12) United States Patent  (10) Patent No.: US 8,072,412 B2
Furukawa  (45) Date of Patent: Dec. 6, 2011

(54) BACKLIGHT, BACKLIGHT DRIVE APPARATUS, DISPLAY APPARATUS

(75) Inventor: Norimasa Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1116 days.

(21) Appl. No.: 11/838,574

(22) Filed: Aug. 14, 2007

(65) Prior Publication Data

US 2007/0290622 A1    Dec. 20, 2007

Related U.S. Application Data

(62) Division of application No. 10/511,706, filed as application No. PCT/JP2004/001213 on Feb. 5, 2004, now Pat. No. 7,413,330.

(30) Foreign Application Priority Data

Feb. 24, 2003 (JP) ................................. 2003-046406

(51) Int. Cl.
   *G09G 3/36* (2006.01)
(52) U.S. Cl. ......................................... 345/102; 349/70
(58) Field of Classification Search .................. 345/102; 349/61–72
   See application file for complete search history.

(56) References Cited

U.S. PATENT DOCUMENTS

| 4,380,791 A | 4/1983 | Nishizawa |
| 5,040,098 A | 8/1991 | Tanaka et al. |
| 5,046,826 A | 9/1991 | Iwamoto et al. |
| 5,438,484 A | 8/1995 | Kanda et al. |
| 5,816,677 A | 10/1998 | Kurematsu et al. |
| 5,851,411 A | 12/1998 | An et al. |
| 5,899,552 A | 5/1999 | Yokoyama et al. |
| 6,157,143 A * | 12/2000 | Bigio et al. .................... 315/307 |
| 6,241,358 B1 * | 6/2001 | Higuchi et al. ............... 362/613 |
| 6,417,833 B1 * | 7/2002 | Takemoto ..................... 345/102 |
| 6,464,367 B2 * | 10/2002 | Ito et al. ........................ 362/613 |
| 6,580,477 B1 * | 6/2003 | Cho ................................ 349/65 |
| 6,671,452 B2 | 12/2003 | Winston et al. |
| 6,795,053 B1 * | 9/2004 | Funamoto et al. ............ 345/102 |
| 6,927,812 B2 | 8/2005 | Cho |
| 6,948,840 B2 | 9/2005 | Grenda et al. |
| 7,268,766 B2 * | 9/2007 | Kim et al. ..................... 345/102 |
| 7,339,565 B2 * | 3/2008 | Kim ................................ 345/88 |
| 2002/0018053 A1 * | 2/2002 | Kyomoto ...................... 345/204 |
| 2002/0063502 A1 | 5/2002 | Wu |
| 2005/0073845 A1 | 4/2005 | Matsui |

FOREIGN PATENT DOCUMENTS

| EP | 308828 A2 | 3/1989 |
| EP | 545429 A2 | 6/1993 |

(Continued)

OTHER PUBLICATIONS

Patent Abstracts of Japan, JP 2002-245834, Aug. 30, 2002.

*Primary Examiner* — Jimmy H Nguyen

(74) *Attorney, Agent, or Firm* — Oblon, Spivak, McClelland, Maier & Neustadt, L.L.P.

(57) ABSTRACT

A proposed backlight is suitable for a large size liquid crystal display. A backlight 2 for illuminating a liquid crystal panel 3 from the rear, is formed by combining a plurality of backlight units 10, 10, . . . . By providing a transparent acrylic board 4 between the backlight 2 and the liquid crystal panel 3, it becomes possible to prevent brightness unevenness from occurring at a junction section of the backlight units 10, 10, . . . , even when the backlight is formed by combining the plurality of the backlight units 10, 10, . . . .

9 Claims, 27 Drawing Sheets

FOREIGN PATENT DOCUMENTS

| | | |
|---|---|---|
| JP | 64-29708 | 2/1989 |
| JP | 9-212116 | 8/1997 |
| JP | 11-203925 | 7/1999 |
| JP | 11-288611 | 10/1999 |
| JP | 2001-93321 | 4/2001 |
| JP | 2002-107720 | 4/2002 |

* cited by examiner

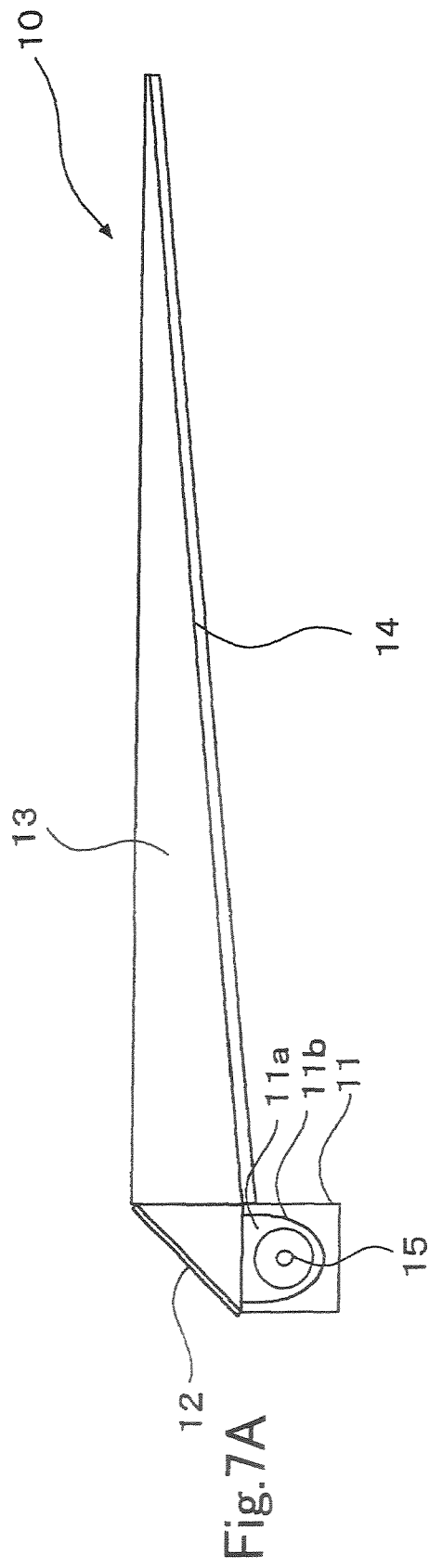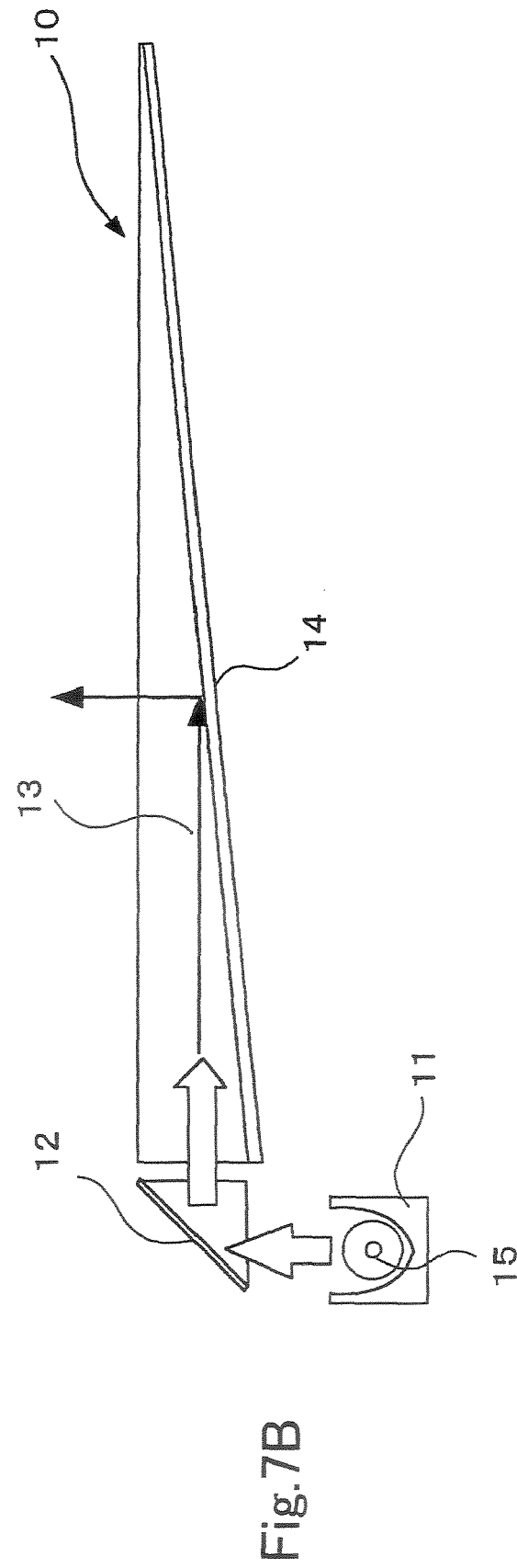

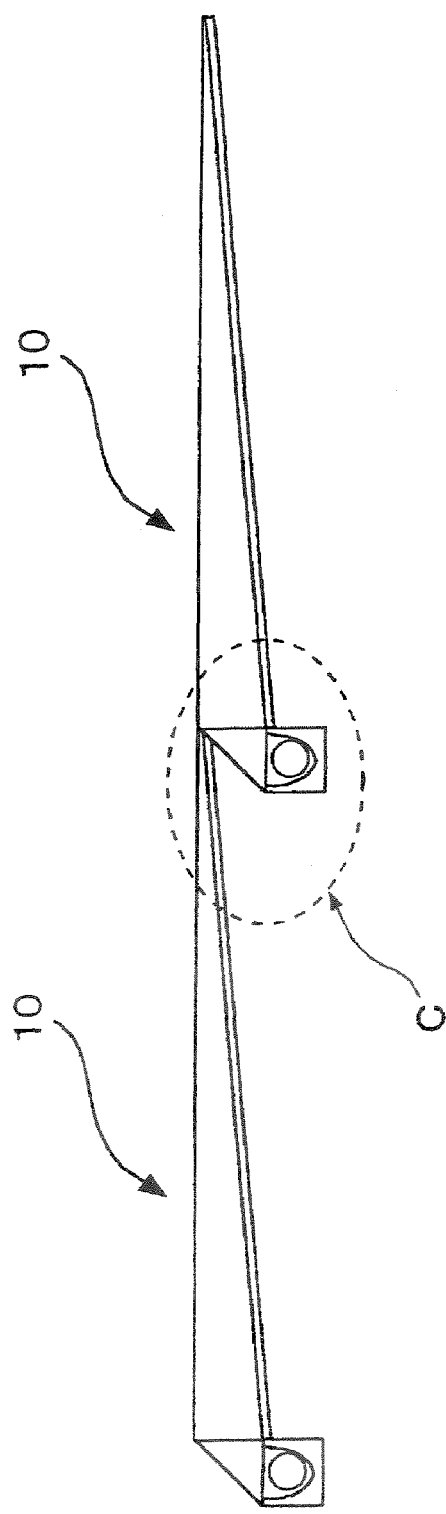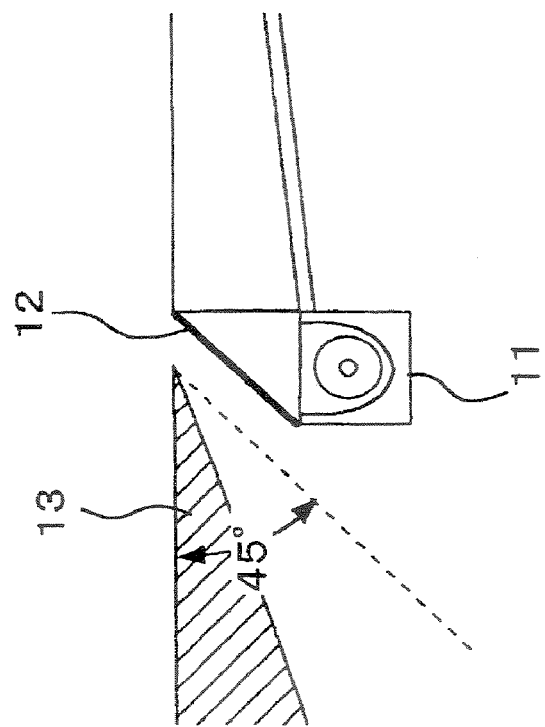
Fig.8A
Fig.8B

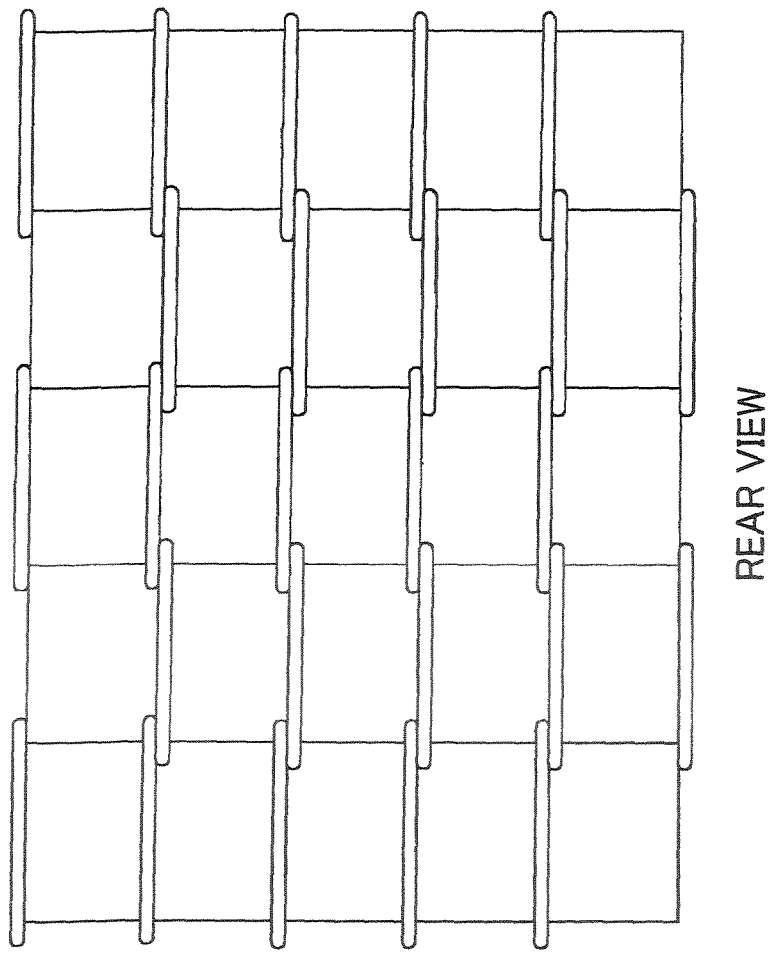
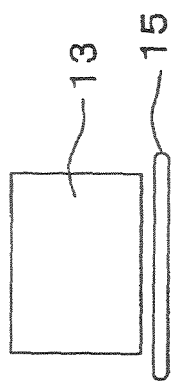
Fig.9

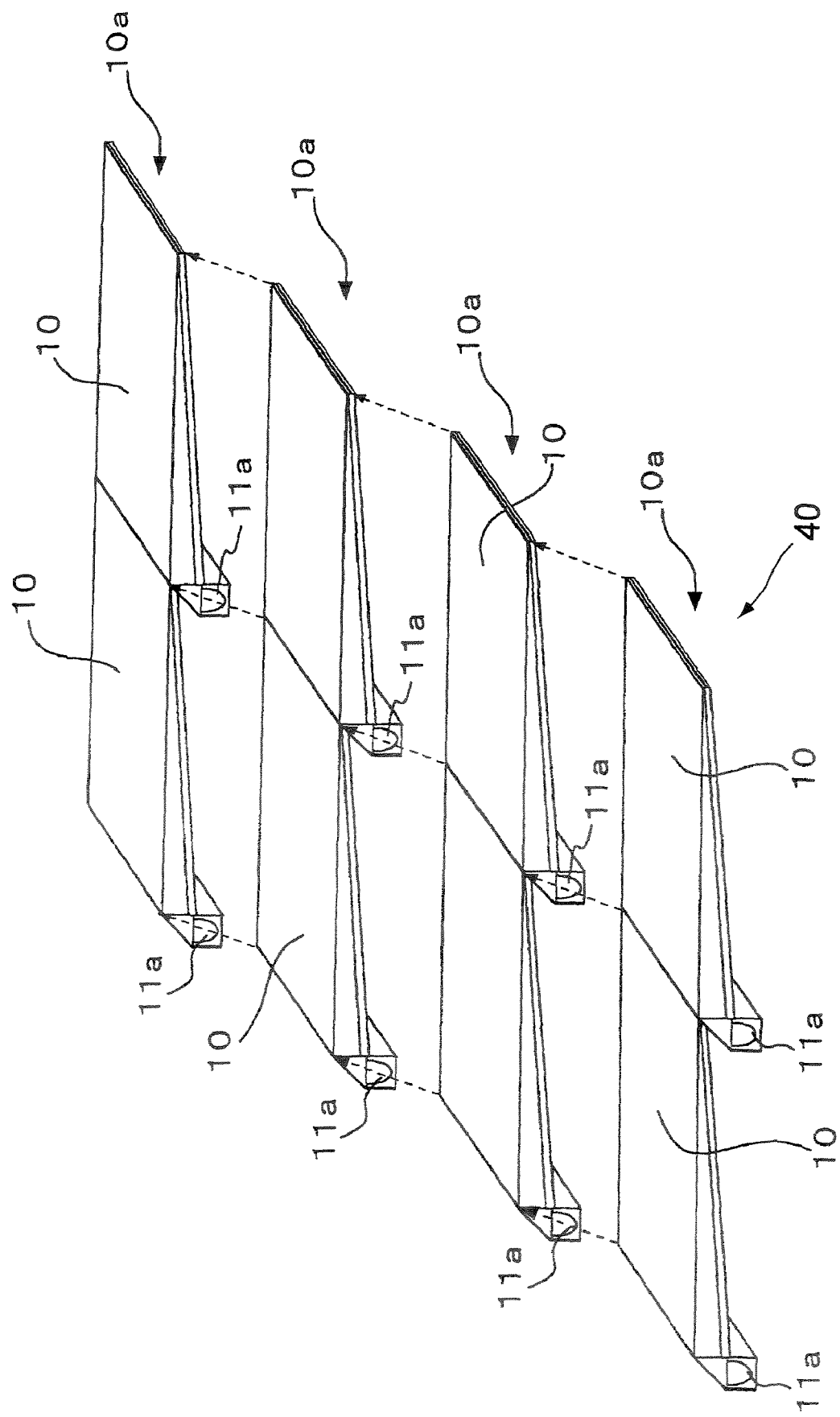

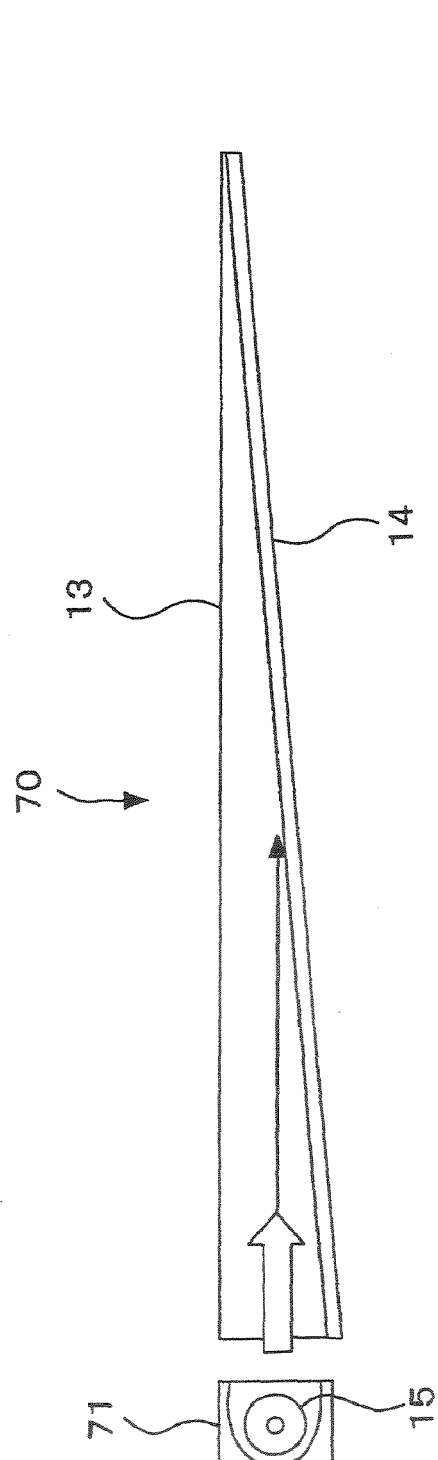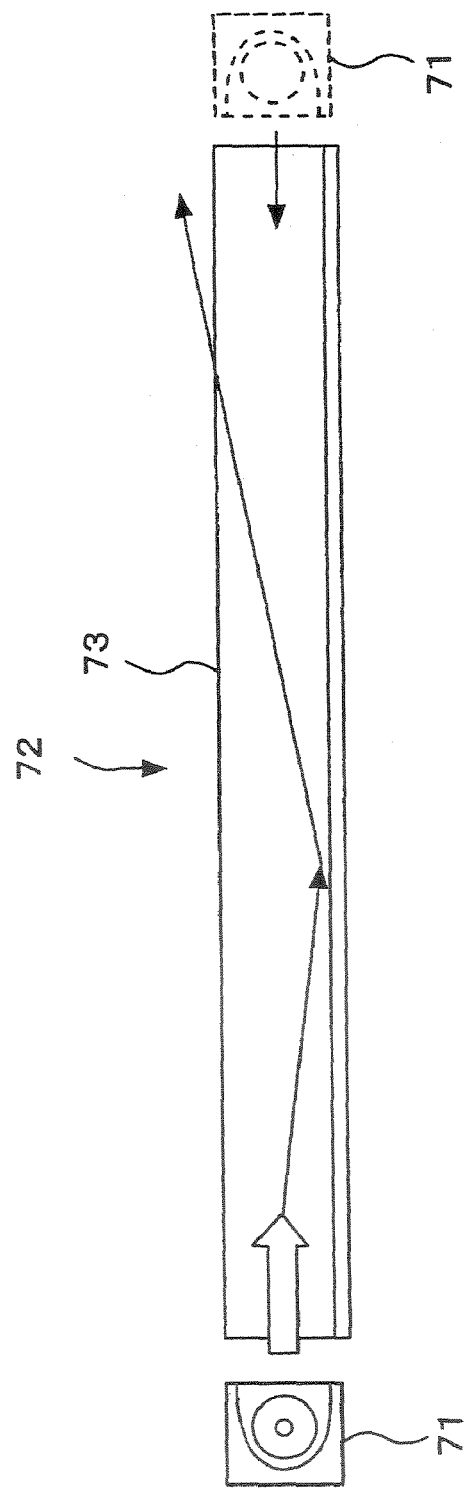
Fig.26A
Fig.26B

BACKLIGHT, BACKLIGHT DRIVE APPARATUS, DISPLAY APPARATUS

CROSS-REFERENCE TO RELATED APPLICATIONS

This application is a divisional application of and claims the benefit of priority under 35 U.S.C. §120 for U.S. Ser. No. 10/511,706, filed Oct. 15, 2004, pending, which is a National Stage application of PCT/JP2004/001213, filed Feb. 5, 2004 and claims benefit of priority under 35 U.S.C. §119 from JP 2003-046406, filed Feb. 24, 2003, the entire contents of each of which are incorporated herein by reference.

FIELD OF THE INVENTION

The present invention relates to, for example, a backlight which illuminates a liquid crystal panel from the rear, a backlight drive apparatus which drives such a backlight, and a display apparatus which is arranged to have such a backlight.

BACKGROUND OF THE ART

In recent years, as for a transmissive type liquid crystal display apparatus using a liquid crystal panel which is widely spread as a display apparatus of a television receiver etc., research and development for enlarging a liquid crystal display apparatus have been performed actively.

As a prior literature for realization of enlarging the liquid crystal display apparatus, a liquid crystal display apparatus is proposed in which a plurality of liquid crystal panels are joined together on the same plane and tiled so as to enlarge a liquid crystal panel, for example (Japanese Patent Application Publication No. H10-096911).

In the transmissive type liquid crystal display apparatus, it is necessary to provide a backlight for irradiating the liquid crystal panel with light from the rear side. For this reason, such liquid crystal display apparatuses can be classified roughly into a bottom backlight system and an edge light (side light) system, according to a structure of the backlight (Japanese Patent Application Publication No. 2001-266605).

In a small-sized liquid crystal display apparatus having a size of approximately 15 inches, the edge light system with which thickness of the backlight can be made thin is employed widely. For example, a backlight with a thickness of approximately 5 mm is realized and put into practical use.

However, in a backlight of the edge light system such as mentioned above, light is incident to a side edge (a side surface) of a light guide plate, and uniform light is emitted from an upper surface side of the light guide plate to the liquid crystal panel, so that a usage efficiency of the light is bad.

For this reason, when the backlight of a conventional side edge system illuminates a large-sized liquid crystal display apparatus having a size of 20 inches or more, for example, there is a disadvantage that the whole liquid crystal panel can not be illuminated uniformly with light of high brightness.

In other words, for example, when the backlight of the large-sized liquid crystal display apparatus is constructed by way of the edge light method, it is conceivable to use a light source of much higher brightness than a light source which is used for a conventional liquid crystal display apparatus with a size of approximately 15 inches. However, such a light source of high brightness does not exist at present.

Therefore, in order to attain high brightness of the large-sized liquid crystal display apparatus, there is only a way that a lot of (for example, three or more) fluorescence tubes are arranged at a side edge of the light guide plate, for securing a quantity of light. There is a limit in obtention of the brightness for displaying a television image. Incidentally, there is no description of a structure of the backlight in the Japanese Laid-open Patent No. H10-096911.

Moreover, when a lot of fluorescence tubes are arranged as the light source on the side edge of the light guide plate so that the light of the fluorescence tubes is taken into the light guide plate, an acrylic resin which forms the light guide plate becomes thick. Thus, when the backlight of a large-sized liquid crystal display apparatus is realized by the side edge, there is a disadvantage that its weight becomes very heavy.

Then, the present invention is invented in view of the points as described above, and provides a backlight suitable for the large-sized liquid crystal display apparatus, the backlight drive apparatus for driving such a backlight and the display apparatus arranged to have such a backlight.

DISCLOSURE OF THE INVENTION

In order to attain the above-mentioned aims, a backlight of the present invention is formed by combining a plurality of backlight units with respect to a lighting surface which illuminates the back of a video display unit formed by a single panel.

According to the present invention, in the backlight for illuminating the video display unit formed by the single panel, it is possible to form a large-sized backlight by combining a plurality of backlight units in the shape of a plane.

Moreover, a display apparatus of the present invention comprises a backlight formed by combining a plurality of backlight units, a video display unit which is arranged on the lighting side of the backlight and formed by one or a plurality of video display panels, and a diffusion board arranged apart from the backlight and between the backlight and the video display unit.

Thus, according to the present invention, by arranging the diffusion board in the position which is apart from the backlight and between the backlight and the video display unit, even when the backlight is formed by combining the plurality of the backlight units, it becomes possible to prevent brightness unevenness from occurring at a junction section of the backlight units.

Moreover, the drive apparatus for the backlight formed by combining the plurality of backlight units of the present invention comprises a drive unit which is provided for each backlight unit and performs drive control of each backlight unit, and a drive control unit which performs drive control of the drive unit.

Thus, according to the drive apparatus for the backlight of the present invention, the backlight units which constitute the backlight are driven by respective drive units and the drive control unit controls the backlight units, so that the whole backlight can be controlled.

BRIEF DESCRIPTION OF THE DRAWINGS

FIG. 7A and FIG. 7B are cross-sectional views of the backlight unit of the first preferred embodiment;

FIG. 8A and FIG. 8B are views showing a structure of a pair of units which are formed by combining the backlight units of the first preferred embodiment;

FIG. 9 show a rear view and a side view of a structure of the whole backlight of the first preferred embodiment;

FIG. 16 is a view showing an example of a combination of the backlight units which constitute the backlight of a second preferred embodiment;

FIG. 26A and FIG. 26B are views showing another example of a structure of the backlight unit which constitutes the backlight;

BEST MODE FOR IMPLEMENTING THE INVENTION

Hereinafter, preferred embodiments of the present invention will be described.

In addition, the preferred embodiments will be described in the following order:

1. Structure of Liquid Crystal Display Apparatus
2. Backlight
2-1 Structure of Backlight
2-2 Structure of Backlight Unit
2-3 Drive Apparatus of Backlight 3. Backlight of Second Preferred Embodiment 4. Backlight of Third Preferred Embodiment 1. Structure of Liquid Crystal Display Apparatus Firstly, a liquid crystal display apparatus of a preferred embodiment will be described by using FIGS. 1-3.

Figure 1:
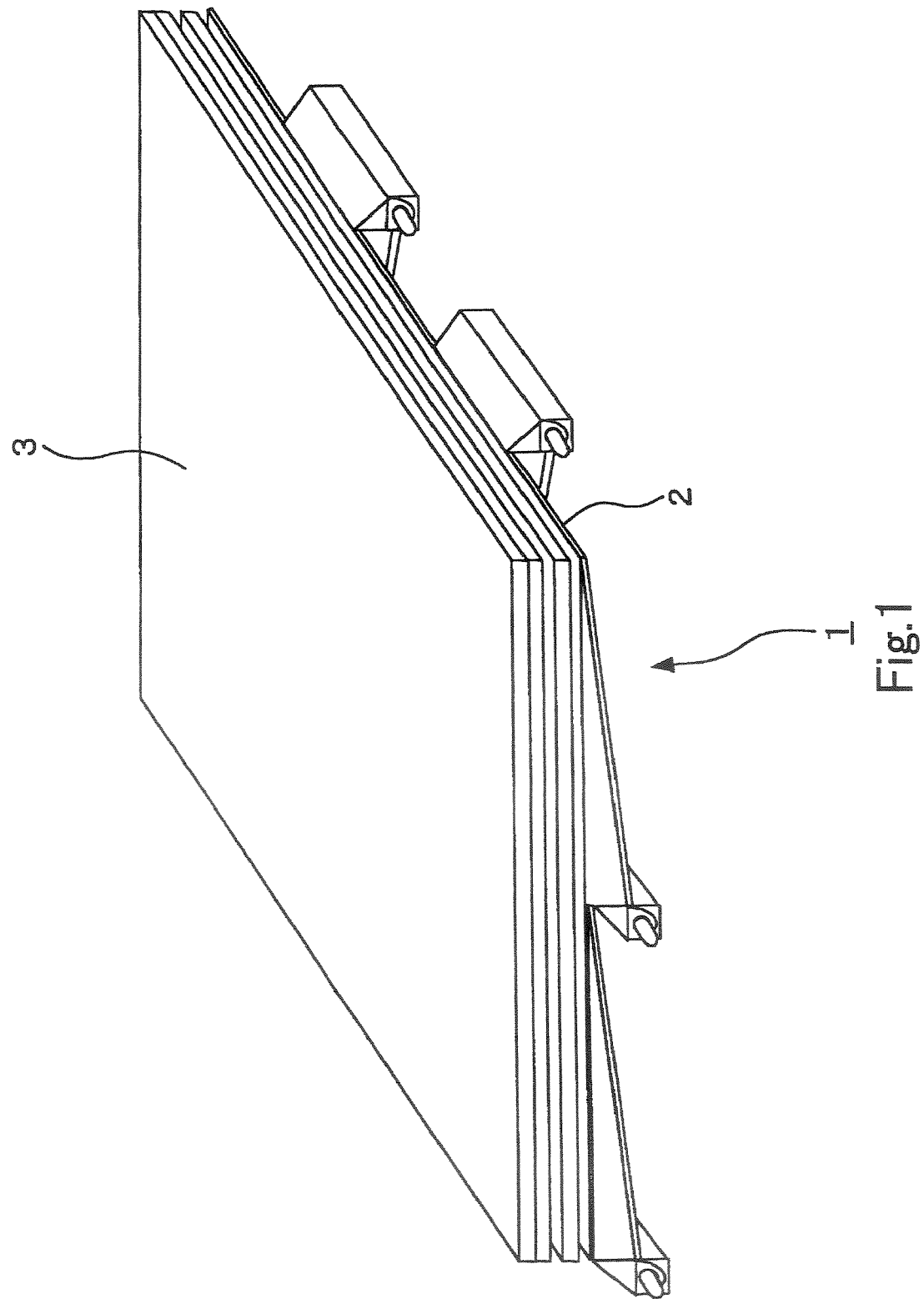
FIG. 1 is an overall view of a liquid crystal display apparatus of a preferred embodiment in accordance with the present invention.
Figure 2:
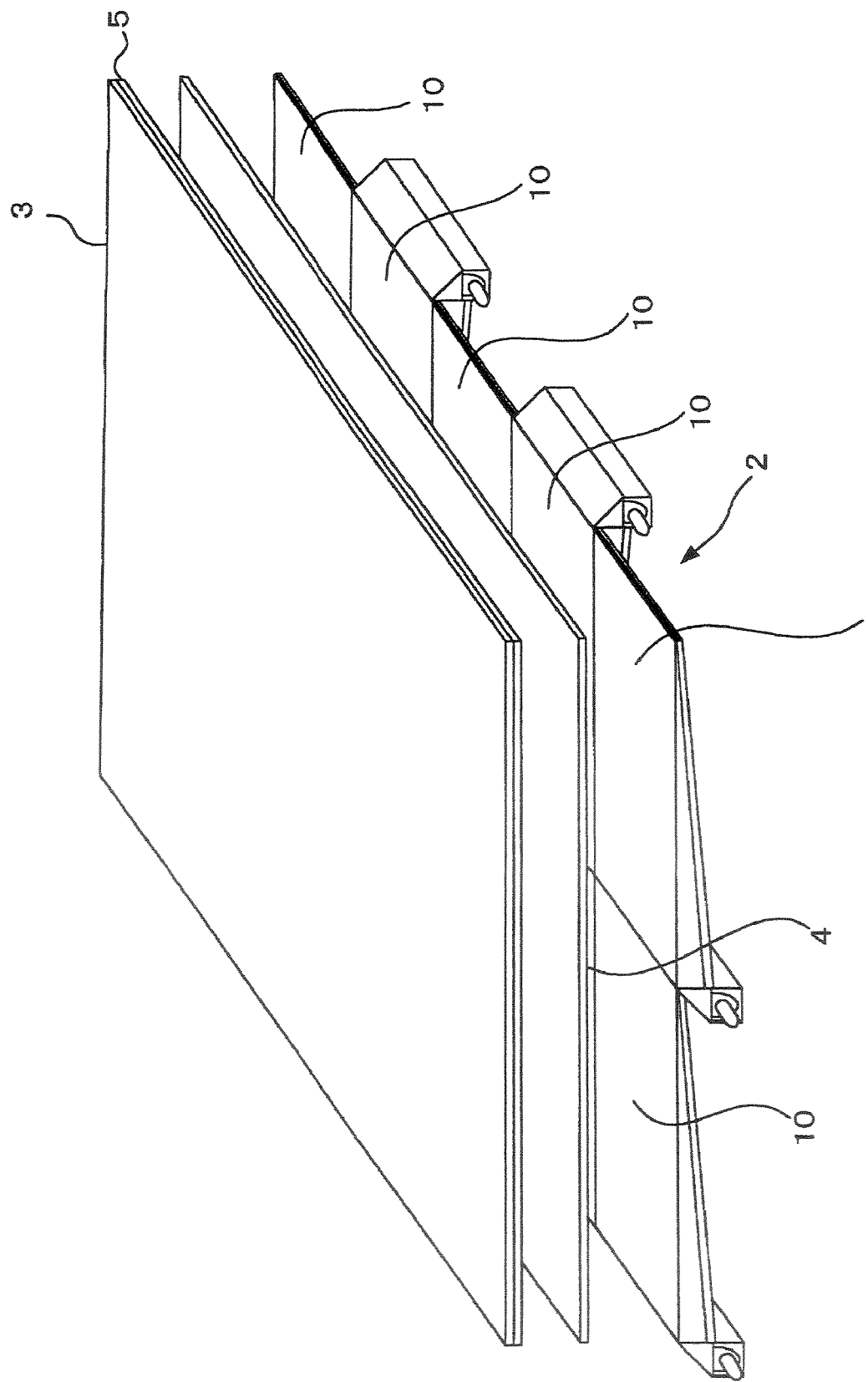
FIG. 2 is an exploded view of the liquid crystal display apparatus of the preferred embodiment.
Figure 3:
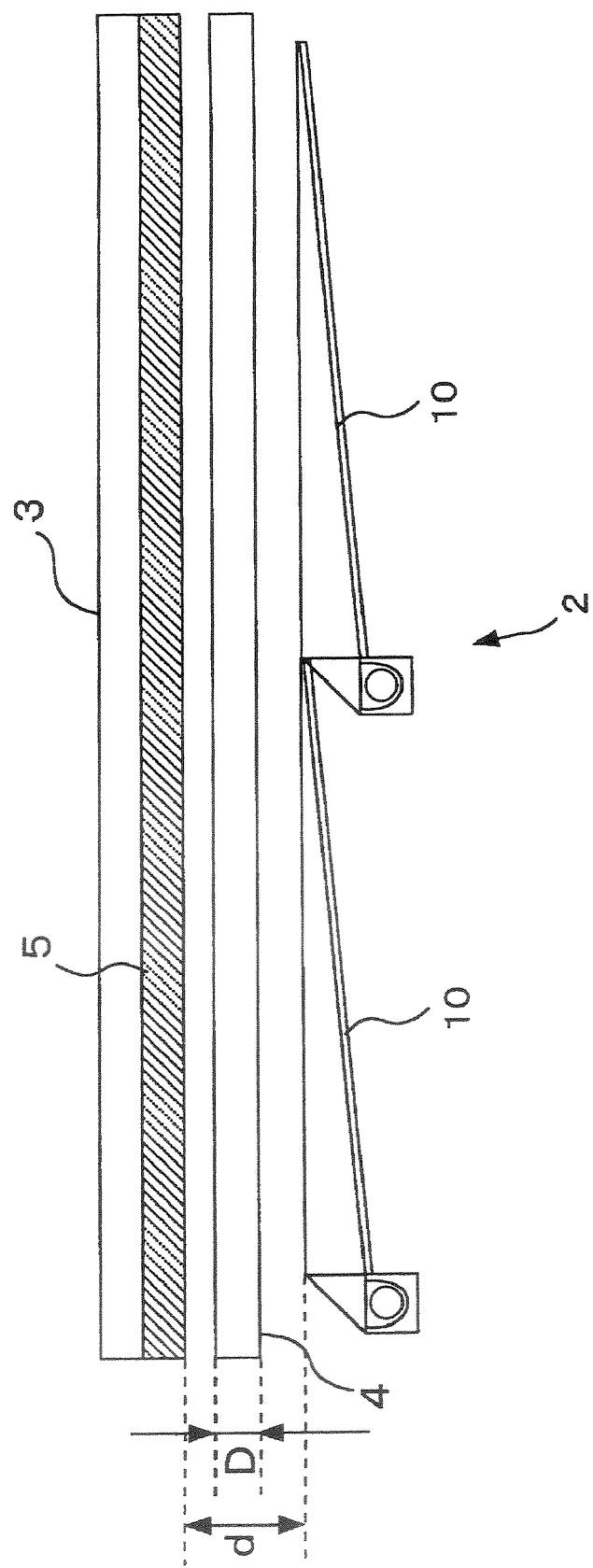
FIG. 3 is a side view of the liquid crystal display apparatus of the preferred embodiment.

FIG. 1 is an overall view of the liquid crystal display apparatus of the preferred embodiment, FIG. 2 is an exploded view, and FIG. 3 is a side view.

As shown in these FIG. 1 through FIG. 3, a liquid crystal display apparatus 1 of the preferred embodiment is arranged to have a backlight 2 under a liquid crystal panel 3.

Further, between the backlight 2 and the liquid crystal panel 3, a transparent acrylic board 4 and a diffusion board 5 are arranged sequentially from the backlight 2 side.

The backlight 2 is formed such that a plurality of backlight units 10, 10, . . . are arranged in a planar shape (a shape of tiles). In addition, a structure of the backlight 2 will be described in detail later.

The liquid crystal panel 3 modulates light which is emitted from the backlight 2 so as to form required image light.

The transparent acrylic board 4 is provided to prevent a shadow from taking place at a combination section of the backlight units 10, when the backlight 2 is arranged in the planar shape by combining the plurality of backlight units 10, 10, . . . , for example.

The diffusion board 5 diffuses the light emitted from the backlight 2 so as to equalize the light irradiating the liquid crystal panel 3. A thickness of the diffusion board 5 in this case is set to a thickness capable of equalizing the light irradiating the liquid crystal panel 3.

In addition, a board thickness D of the transparent acrylic board 4 and a distance d between the backlight 2 and the diffusion board 5 as shown in FIG. 3 may only be set properly to a distance avoiding the shadow at the combination section of the backlight unit 10.

Further, if the distance d between the backlight 2 and the diffusion board 5 is caused to be larger, it is possible to prevent the shadow of the combination section of the backlight units 10, without necessarily forming the transparent acrylic board 4.

2. Backlight of First Preferred Embodiment 2-1 Structure of Backlight

Next, the backlight of a first preferred embodiment of the present invention will be described by using FIG. 4 and FIG. 5.

Figure 4:
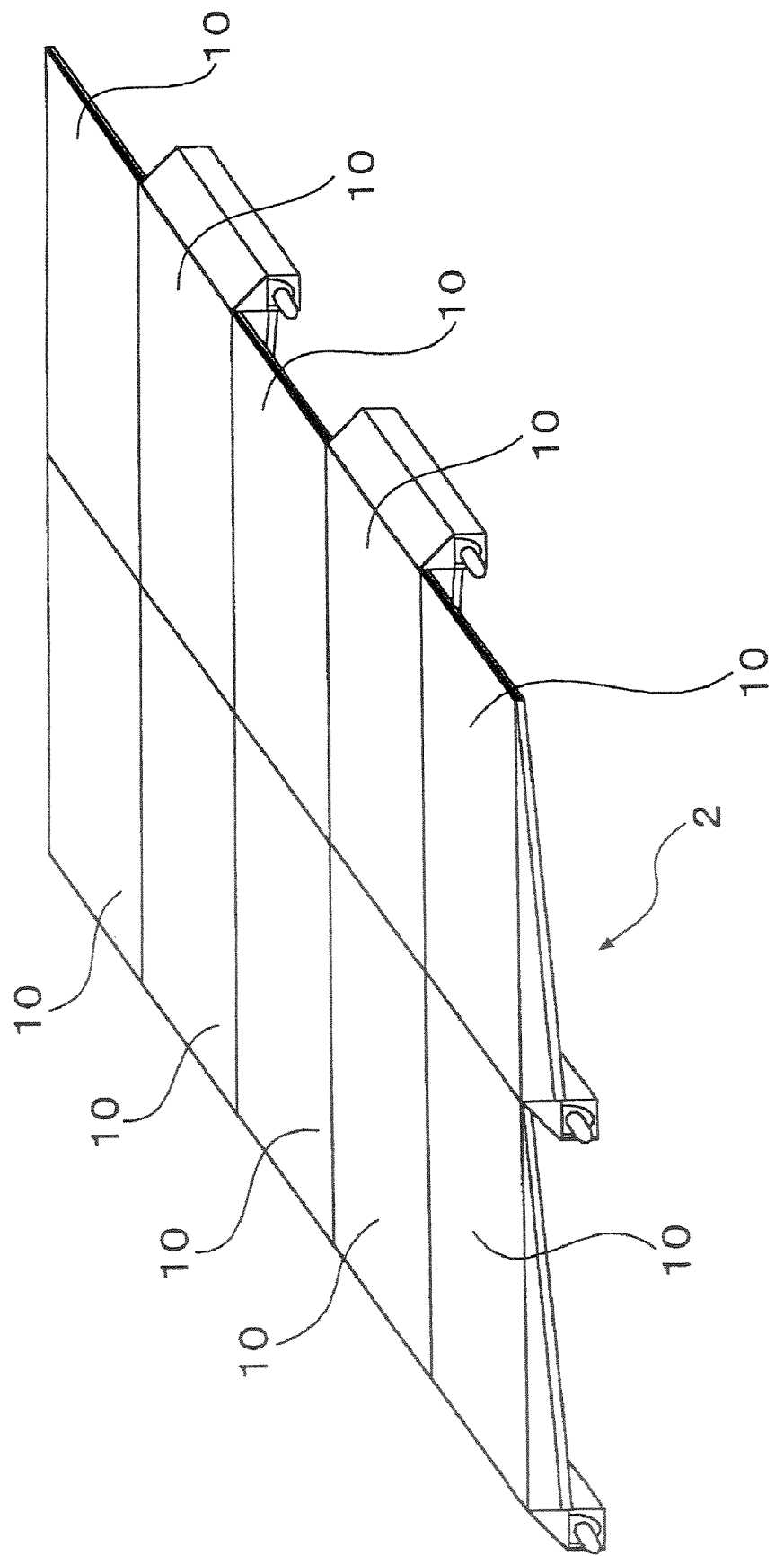
FIG. 4 is an overall view of a backlight of a first preferred embodiment.

FIG. 4 is an overall view of the backlight of the first preferred embodiment. FIG. 5 is a view showing a partial structure.

The backlight 2 as shown in FIG. 4 is formed by combining the plurality of backlight units 10, 10, . . . in the planar shape. In other words, the backlight 2 for illuminating the liquid crystal panel 3 of single structure from the back is formed by combining the plurality of backlight units 10, 10, . . . in the planar shape.

Figure 5:
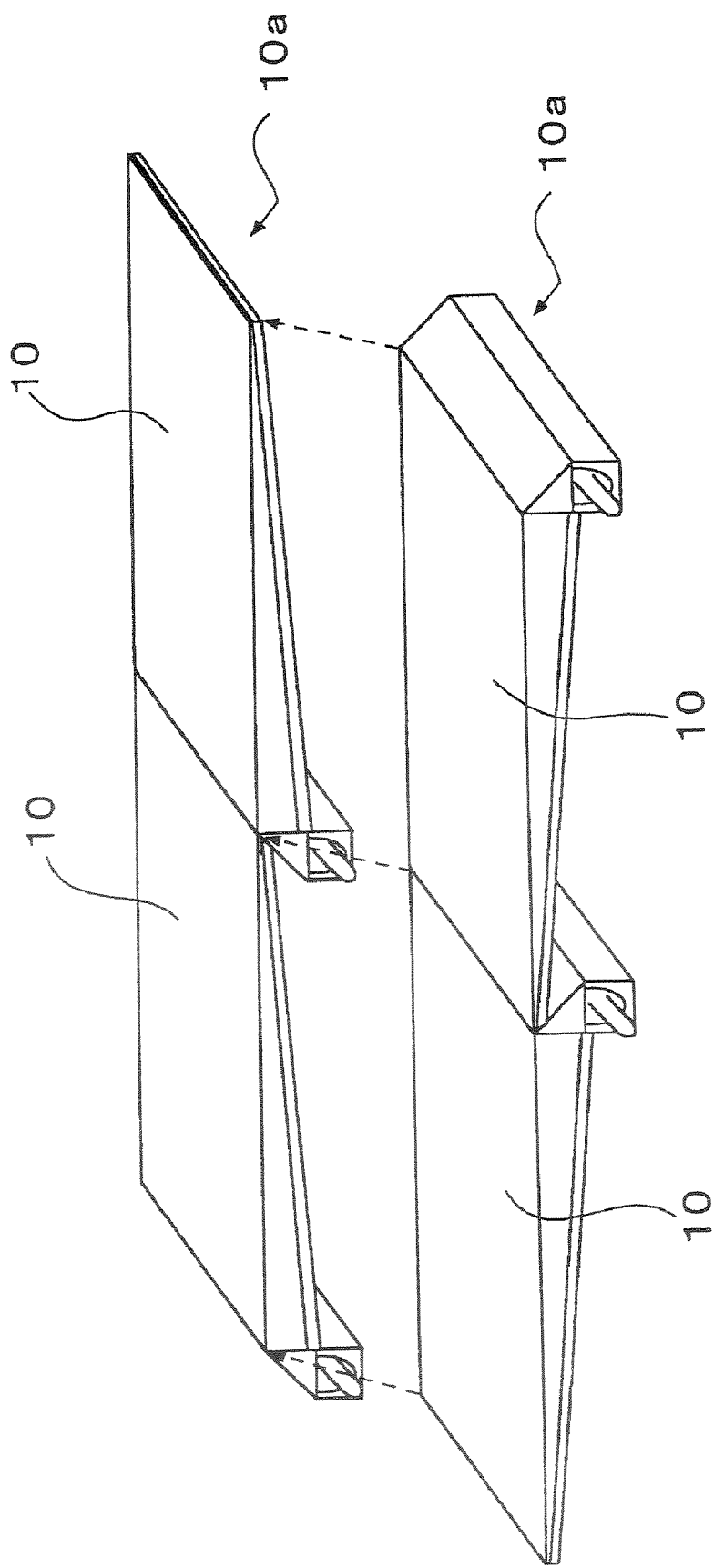
FIG. 5 is a view showing a partial structure of the backlight of the first preferred embodiment.

As a method of combining the backlight units 10, 10, . . . in this case, as shown in FIG. 5, a pair of units 10a having combined two backlight units 10 and 10 in the same direction is considered as one backlight unit by arranging these alternately, i.e., arranging these in different directions which differ from one another by 180 degrees, so that the backlight 2 as shown in FIG. 4 is formed.

2-2 Structure of Backlight Unit

Next, a structure of the backlight unit will be described by using FIG. 6A and FIG. 6B, and FIG. 7A and FIG. 7B.

Figure 6A:
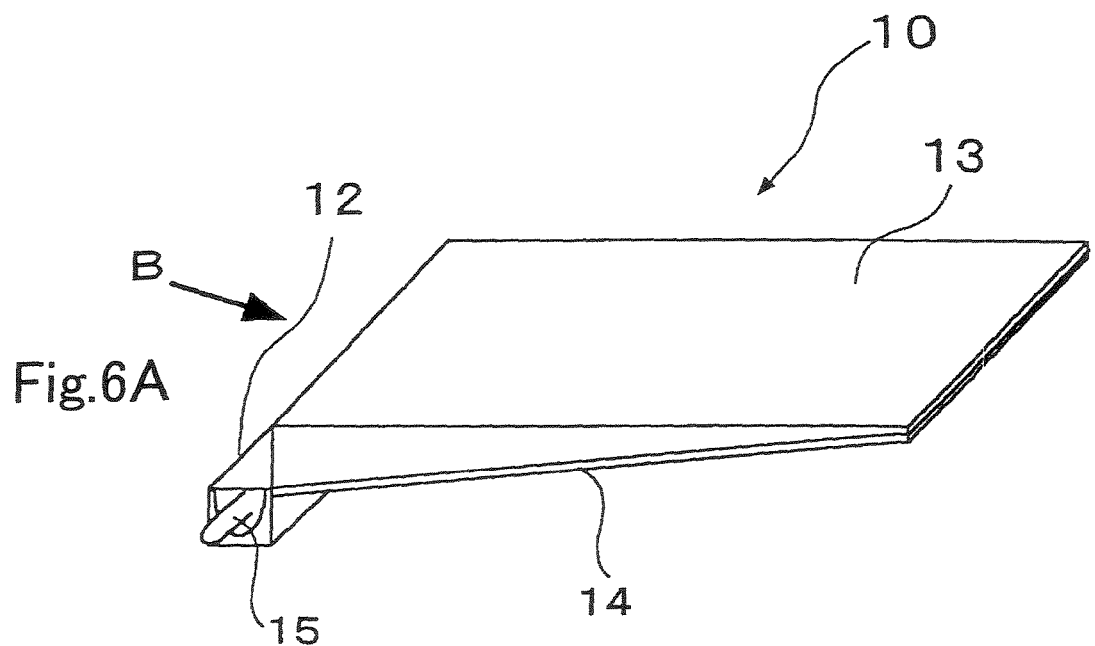
FIG. 6A and FIG. 6B are respectively an overall view and a back view showing a structure of a backlight unit of the first preferred embodiment.
Figure 6B:
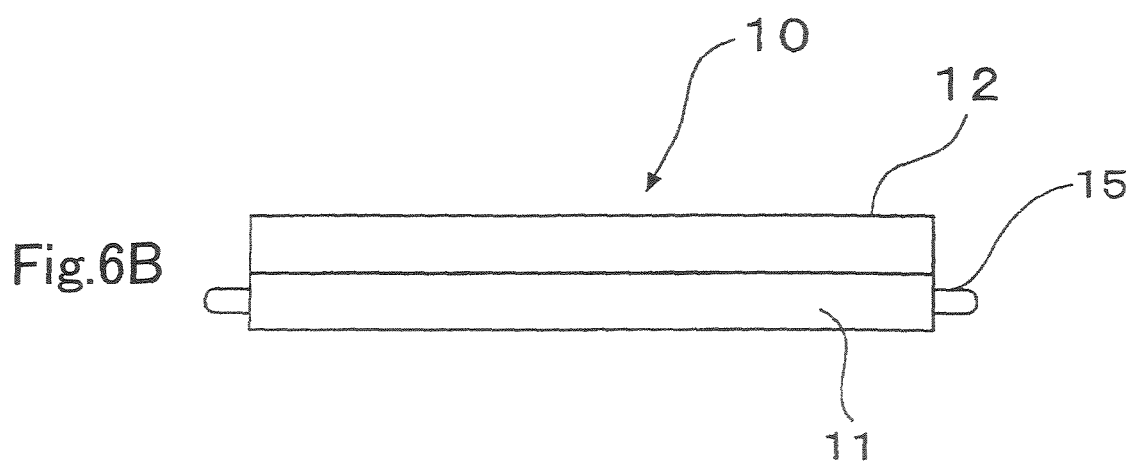

FIG. 6A and FIG. 6B are views showing the structure of the backlight unit, and FIG. 6A is an overall view of the backlight unit, and FIG. 6B is a back view. Further, FIG. 7A is a cross-sectional view and FIG. 7B is an exploded cross-sectional view.

Moreover, FIG. 8A and FIG. 8B are views for explaining a structure of the pair of units which are formed by combining two backlight units. FIG. 8A is an overall view of the pair of units, and FIG. 8B is an enlarged view of the combination section.

As shown in FIG. 6A and FIG. 6B, and FIG. 7A and FIG. 7B, the backlight unit 10 of the preferred embodiment comprises a light source unit 11, a reflective prism 12, a light guide plate 13, and a condensing processed surface 14.

The light source unit 11 is formed of, for example, aluminum or glass, and is provided therein with a lamp accommodation section 11a of a substantially semi-circular shape for accommodating a fluorescence tube which is a light source 15. Further, a light reflector (a condensing mirror) 11b for condensing light from the light source 15 and for emitting the light to the reflective prism 12 side is formed on a surface of the lamp accommodation section 11a.

A light reflector 11b is, for example, a light reflector which reflects the light from the light source 15, and formed by way of vapor-deposition or pasting silver on a surface of a lamp accommodation section 11a, for example. In this case, both ends of the fluorescence tube, which is the light source 15 accommodated in the lamp accommodation section 11a, protrude from both sides of the light source unit 11, as shown in FIG. 6B.

The reflective prism 12 is formed of an acrylic resin, for example, and arranged for deflecting the light emitted from the light source unit 11 and for guiding it from a side of the light guide plate 13 to the inside. When the reflective prism 12 is so formed between the light source unit 11 and the light guide plate 13, and an optical incidence portion of the light guide plate 13 is used as a prism input, then it is possible to arrange the light source unit 11 on the back of the light guide plate 13, and to inject the light into a side surface (side) of the light guide plate 13 by means of the light source unit 11 arranged on the back, as can be seen from FIG. 7B. In addition, although the light source unit 11 is arranged on a short side of the light guide plate 13 herein, it is also possible to arrange the light source unit 11 on a long side of the light guide plate.

The light guide plate 13 is formed of an acrylic resin having a diagonal size of several inches, for example. Further, the light guide plate 13 in this case is formed, for example, in a so-called wedge shape where a board thickness of the light guide plate 13 is not flat but formed to become thinner as it is away from the optical incidence portion as illustrated.

The condensing processed surface 14 has a processed surface which is formed so as to equalize light flux emitted from an upper boundary, which is a lighting side of the light guide plate 13, and irradiating the liquid crystal panel 3. For example, the processed surface is formed to be a Fresnel surface or is formed to be a reflective surface having a size corresponding to a distance from the optical incidence portion.

The light source 15 is, for example, a cold cathode lamp which is caused to be cylindrical, and is arranged so that a fluorescent material is excited by ultraviolet rays generated within a glass tube so as to externally emit visible light. In addition, a light emitting diode element (LED: Light Emitting Diode) can be used for the light source 15 other than the fluorescence tube.

As shown in FIG. 8A and FIG. 8B, the combination section of the pair of units 10a formed by combining two backlight units 10 and 10 in the same direction is as shown in FIG. 8B. In other words, a shape of the reflective prism 12 attached to the light guide plate 13 of the backlight unit 10 is substantially triangular and a shape of the light guide plate 13 combined with this reflective prism 12 is wedge-shaped, so that a shape of an end of the light guide plate 13 is determined considering the shape of the reflective prism 12.

If an angle of the back of the reflective prism 12 is 45 degrees, and if an angle of a tip side of the light guide plate 13 is 45 degrees or less, even when two sets of the backlight units 10 and 10 are combined in the same direction, then the light guide plates 13 and 13 of the backlight units 10 and 10 can be combined with each other without a gap, as shown in FIG. 8A.

In addition, the shape of the light guide plate 13 is described as being wedge-shaped in the preferred embodiment, which is merely an example. When at least the shape of the end surface of the light guide plate 13 is combined with the back of the reflective prism 12, it may only be a shape allowing the light guide plate 13 and 13 of the backlight units 10 and 10 to be combined without a gap.

However, as shown in FIG. 6B, in this case, parts of the fluorescence tube, which is the light source 15, protrude from both sides of the light source unit 11. When the pair of units 10a in the same direction are arranged in the same direction, i.e., when the pair of units 10a and 10a are arranged such that the light source units 11 of the backlight unit 10 are brought into contact with each other, parts protruding from both the sides of the light source unit 11s are contacted, so that the pair of units 10a and 10a cannot be arranged without a gap.

Then, in the preferred embodiment, when the pair of units 10a and 10a are arranged, the pair of units 10a and 10a are alternately arranged as shown in FIG. 5, so that the plurality of backlight units 10 and 10 are arranged in the planar shape without a gap as shown in FIG. 4, to thereby realize the backlight 2.

Thus, in this preferred embodiment, the backlight 2 for illuminating the liquid crystal panel 3 is formed by using the plurality of backlight units 10, so that, for example, the backlight 2 can be realized which is capable of illuminating the whole liquid crystal panel 3 having a large size, such as 20 inches or more, with light of high brightness.

Further, if the backlight 2 is constructed in a manner as in the preferred embodiment, a size of the whole backlight is determined by a combination number of sheets of the backlight units 10 in both the vertical and horizontal directions, so that there is an advantage that components of the backlight 2 can be used commonly, from a small one to a large-sized one.

Moreover, in the preferred embodiment, the shape of the light guide plate 13 of the backlight unit 10 is caused to be wedge-shaped, and the thickness of the acrylic resin which is a material of the light guide plate 13 can be caused to be thin, so that even when the backlight of the large-sized liquid crystal display apparatus of 20 inches or more is constructed, for example, weight per unit area of the backlight can be caused to be light. In other words, even when the backlight 2 is enlarged, an increase in weight is only proportional to the area, whereby the backlight 2 can be caused to be lighter.

Further, if the reflective prism 12 is formed at the optical incidence portion of the light guide plate 13 which constitutes the backlight unit 10, the light source unit 11 is arranged on the back of the light guide plate 13, and a shape (angle) of the end part of the light guide plate 13 is set up considering the shape (angle) of the reflective prism 12, then it becomes possible to combine the backlight units 10 and 10 without a gap even when the backlight units 10 and 10 are arranged in the same direction.

Thus, for example, the shadow of the combination section of the plurality of backlight units 10, 10, ... can be prevented.

Further, even if there is a gap at the combination section of the backlight units 10 and 10, when the liquid crystal display apparatus 1 is constructed in a manner as in the preferred embodiment, the shadow of the combination section of the backlight units 10 and 10 can substantially be inconspicuous by means of the transparent acrylic board 4 disposed between the backlight 2 and the diffusion board 5 or the distance d between the backlight 2 and the diffusion board 5, whereby there is no difficulty in realizing the backlight when constructing the liquid crystal display apparatus 1.

In addition, the number of sheets of the backlight units 10, 10, ... which form the backlight 2 of the preferred embodiment may arbitrarily be set up according to the shape of the whole backlight 2 and the shape of the backlight unit 10.

Further, for example, in case an image of 4:3 is displayed on the liquid crystal panel of an aspect ratio of 16:9, when the shape of the backlight unit 10 is set to a required size, for example, the backlight unit 10 for a part where an image is not displayed on the liquid crystal panel can be switched off to form a black screen.

2-3 Drive Apparatus of Backlight

Next, a drive apparatus for a backlight such as described above will be described using FIGS. 9 through 14.

Here, it will be described assuming that backlight units are arranged vertically (column) and horizontally (row), five for each, so as to form the backlight.

FIG. 9 are a rear view and a side view of the thus constructed backlight. It can be seen from FIG. 9 that the light source 15 of the backlight units 10 which form the backlight 2 are arranged alternately with respect to the light guide plate 13.

Figure 10:
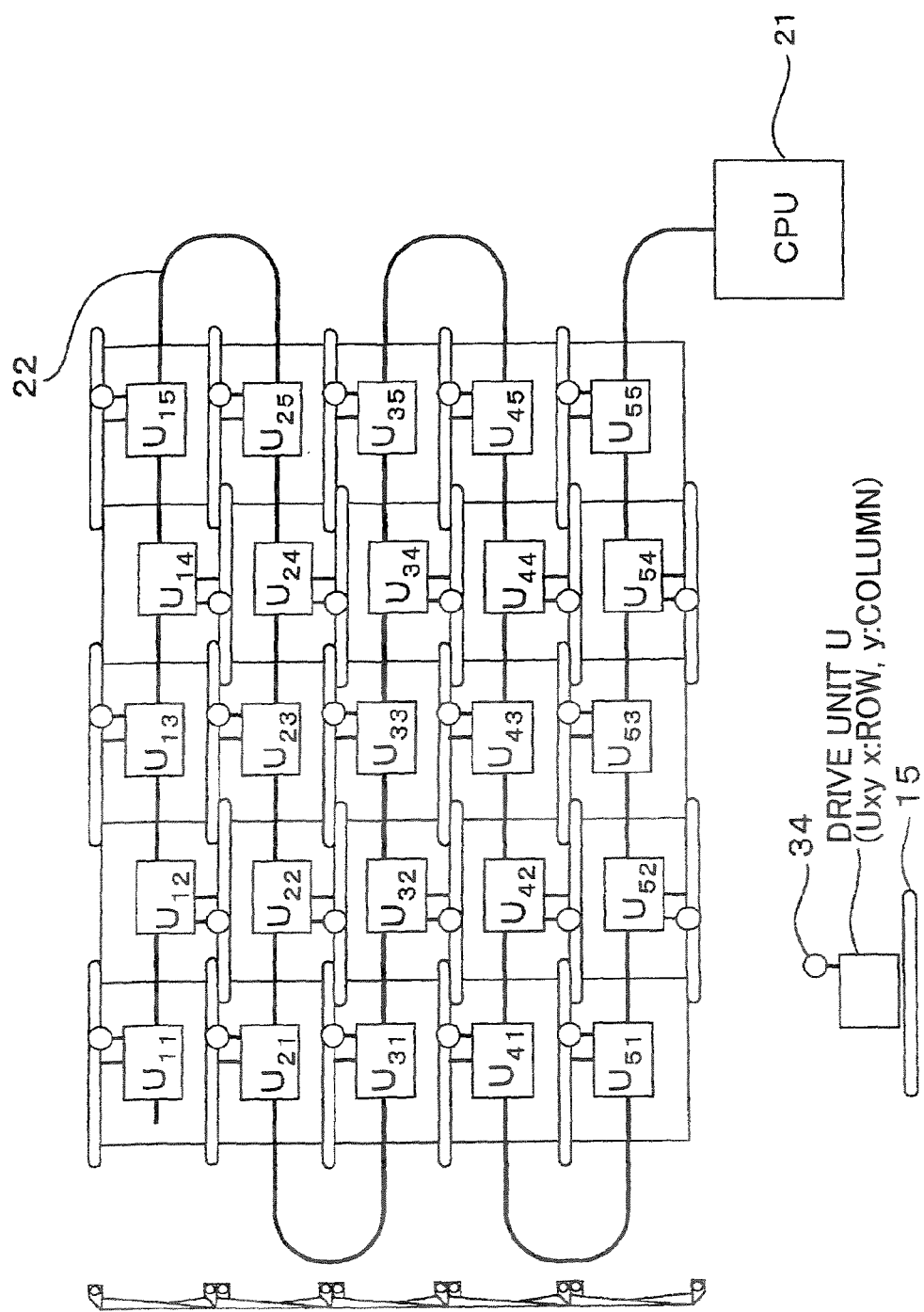
FIG. 10 are views showing an example of the whole drive apparatus which drives the backlight of the first preferred embodiment.

The drive apparatus for driving the above-mentioned backlight 2 is as shown in FIG. 10. In this case, a drive unit Uxy (x: row, y: column) is formed for each backlight unit 10 which forms the backlight 2. These drive units Uxy are connected to an external CPU (Central Processing Unit) 21 through a bus line 22.

The external CPU 21 communicates with the drive units Uxy through the bus line 22 and controls the whole backlight 2.

For example, light quantity data are acquired from all of the backlight units 10, 10, ... which form the backlight 2, and the brightness of each of the backlight units 10, 10 is obtained. If the quantity of light of the backlight units 10, 10, ... which form the backlight 2 deviates from a predetermined area, instructions (command or data) to adjust the quantity of light are sent to the drive unit Uxy.

Further, although not shown, for example, when a user performs a required operation for adjusting a brightness level of the display apparatus so as to change a brightness level of the whole backlight 2, instructions (command and data) to change the brightness level to all the drive units Uxy are sent.

For example, the bus line 22 is a bus of the I²C (Inter Integrated Circuit) standard and has a data bus, a command bus, and an address bus.

In this case, the external CPU 21 and respective drive units Uxy are connected by means of the bus line 22 in a daisy chain (single line connection), thus allowing communication between the external CPU 21 and each drive unit Uxy and communication between the drive units Uxy.

In the preferred embodiment, the drive unit Uxy is provided for each of the backlight units 10 and 10. For example, starting with the drive unit Uxy in the upper left as shown in FIG. 10, five sheets of them are arranged in the row direction (x direction) and five sequences of them are arranged in the column direction (y direction). In other words, in this case, as shown in FIG. 10, a total of 25 drive units Uxy are provided, from a drive unit U11 corresponding to the upper left backlight unit 10 (where, the light guide plate 13 is shown) to a drive unit U55 corresponding to the lower right backlight unit 10.

These drive units Uxy are connected in the order of, for example, drive units U11→U12→, ..., U15→U25→U24→, ..., U21→U31→, ..., →U54→U55 by means of the bus line 22. The drive unit U55 is connected with the external CPU 21.

The above-mentioned drive units Uxy are arranged to control the backlight unit 10, based on various commands transmitted from the external CPU 21 through the bus line 22.

Thus, the external CPU 21 can choose an arbitrary drive unit Uxy on the bus line 22 according to an address signal which identifies each of the drive units Uxy and is transmitted over the bus line 22. For example, it is also possible that the external CPU 21 may control operations of all the backlight units 10 and 10 simultaneously by way of simultaneous selection so as to have the whole backlight 2 turned off.

Further, since command communication between respective drive units Uxy can also be established in this case, it is possible to exchange various data among the drive units Uxy, for example.

In addition, in the preferred embodiment, although it is arranged that the whole backlight 2 is controlled by the external CPU 21, it is also possible to arrange that any of the drive units Uxy provided in the backlight unit 10 of the backlight 2 may be a host CPU so as to control the whole backlight, for example.

Figure 11:
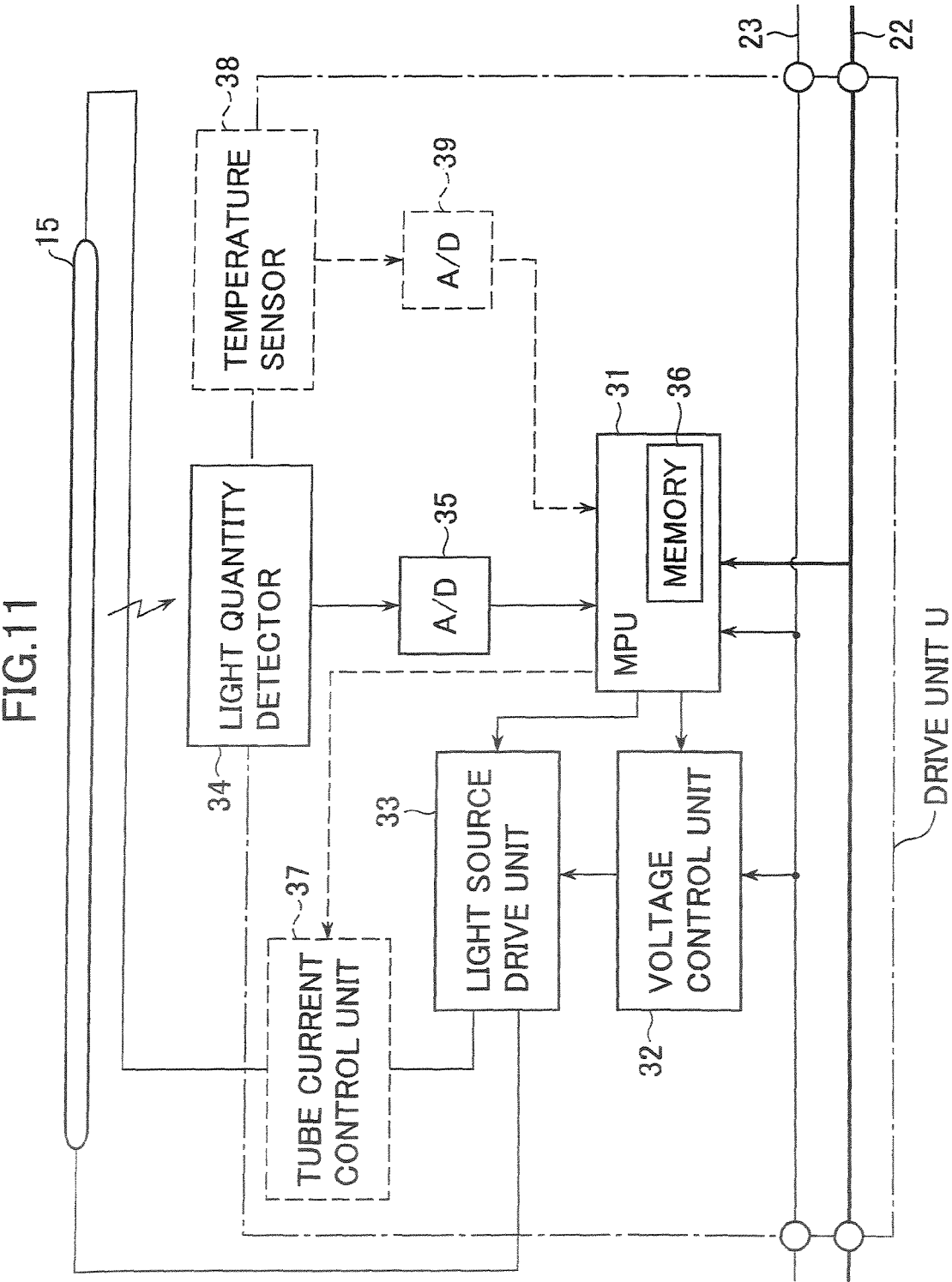
FIG. 11 is a block diagram of a structure of a drive unit which drives the backlight unit which constitutes the backlight of the first preferred embodiment.

FIG. 11 is an example of a block diagram of a drive unit U such as described above.

As shown in FIG. 11, the drive unit U is constructed to have at least an MPU (Micro Processing Unit) 31, a voltage control unit 32, a light source drive unit 33, a light quantity detector 34, and an A/D converter 35.

The MPU 31 controls the whole drive unit U, based on the various commands etc. which are transmitted through the bus line 22.

For example, the light quantity data which are detected by the light quantity detector 34 and converted to digital data by means of the A/D converter 35 are transmitted to the external CPU 21, and a quantity of light of the fluorescence tube which is the light source 15 is adjusted based on the light quantity data.

Further, a memory 36 is provided in the MPU 31, so that it is possible to hold data etc. from the external CPU 21. In addition, a drive voltage is supplied to the MPU 31 through a power supply line 23 disposed together with the bus line 22.

The voltage control unit 32 controls a power supply voltage from the power supply line 23 to be a predetermined voltage level, which is outputted to the light source drive unit 33. By controlling the voltage level supplied to the light source drive unit 33, based on an offset data etc. held in the memory 36 of the MPU 31, brightness unevenness is corrected on a per backlight unit basis.

In addition, a tube current control unit 37 as shown by broken lines may be provided between the light source 15 and the light source drive unit 33, and a tube current which flows when driving the light source 15 may be controlled based on the offset data stored in the memory 36 of the MPU 31, to thereby correct the brightness unevenness per unit backlight unit 10 which constitutes the backlight 2. The tube current control unit 37 as mentioned above can easily be constituted by a variable resistor etc.

The light source drive unit 33 comprises an inverter etc., for example, converts a direct current voltage supplied from the voltage control unit 32 into an alternating current voltage so as to be supplied to the fluorescence tube which is the light source 15.

Further, the light source drive unit 33 controls the quantity of light of the light source 15 to be a predetermined quantity of light (brightness) level according to a control signal supplied from the MPU 31.

As a specific method of controlling a light quantity level in the light source drive unit 33 as mentioned above, a method of controlling the quantity of light by duty modulation can be envisaged depending on a type of the light source 15, if the light source 15 is the fluorescence tube, for example.

By "method of controlling the quantity of light by duty modulation" we mean a method of controlling the quantity of light of the light source 15 from 100% to 0% (turned off continuously when a main drive frequency is approximately 70 kHz, and the high frequency is changed into a ratio in time of ON-OFF (duty) at 60 Hz intervals.

The light quantity detector 34 comprises a photo-coupler etc., converts a light quantity value of the light source 15 into a corresponding electric signal which is outputted to the A/D converter 35.

The A/D converter 35 converts an analog output according to the light quantity value from the light quantity detector 34 into a digital data which is outputted to the MPU 31.

Further, the drive unit U can suitably modify or add a light quantity detection means for detecting a change in quantity of light (brightness), according to a type of the light source 15, a specification of the MPU 31, etc.

Figure 14:
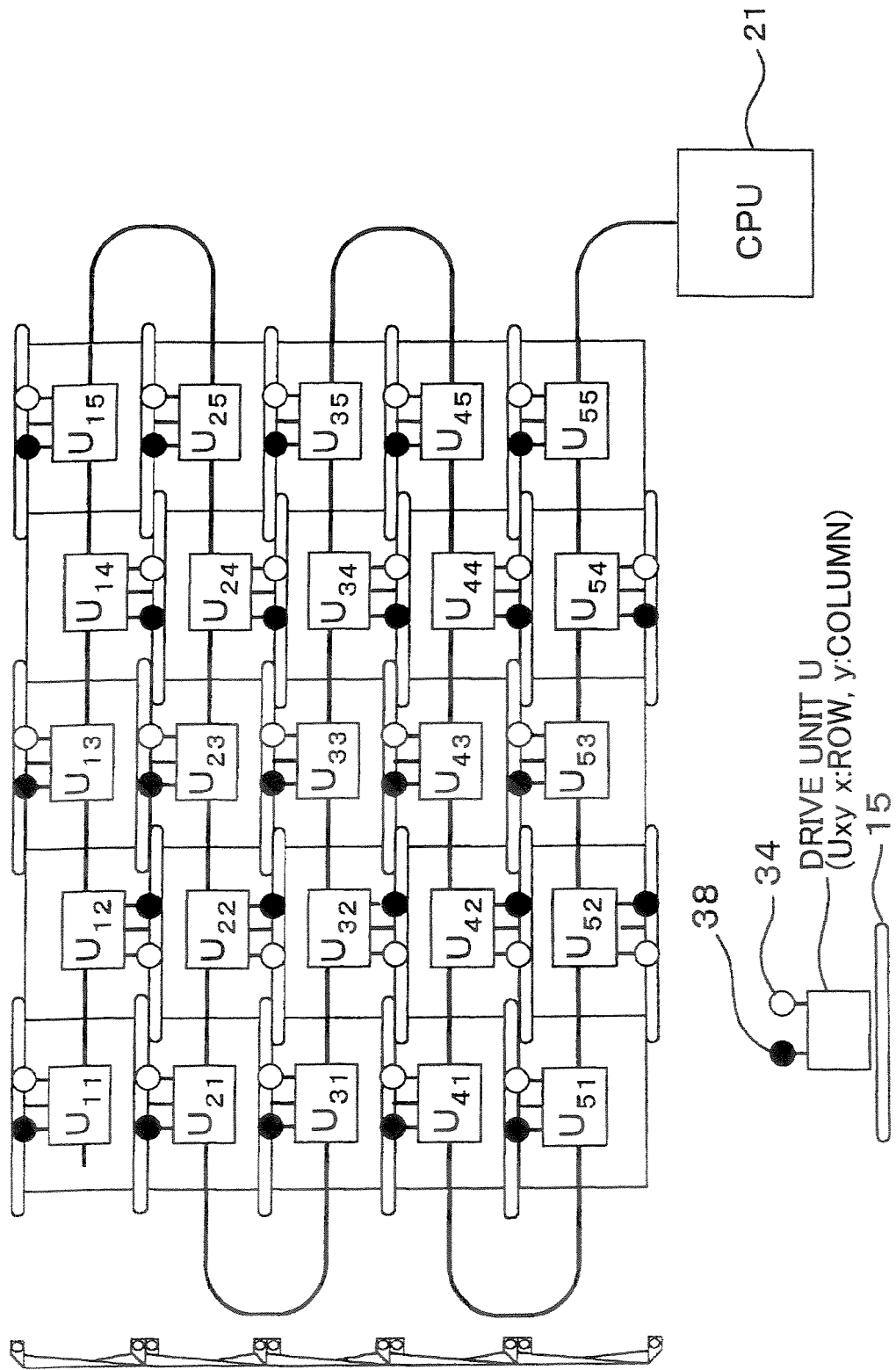
FIG. 14 are views showing another example of a structure of the drive apparatus which drives the backlight of the first preferred embodiment.

For example, a temperature detector 38 as shown by broken lines may be provided as the light quantity detection means in addition to the above-mentioned light quantity detector 34 when the light source 15 is formed by the LED. In this case, a structure of the whole backlight drive apparatus is as shown in FIG. 14, the light quantity detector 34 and the temperature detector 38 from each drive unit U are attached to the light source 15.

In this case, temperature information detected by the above-mentioned temperature detector 38 is converted into a digital data by the A/D converter 39, then supplied to the MPU 31.

Then, based on this temperature data, the MPU 31 controls the drive voltage which is supplied from the light source drive unit 33 to the light source 15.

The above-mentioned temperature detector 38 is effective when the light source 15 is constituted by the LED etc. whose brightness considerably changes as a temperature changes.

Thus, in the drive apparatus for the backlight of the preferred embodiment, the external CPU 21 which is a drive control unit performs drive control of the drive unit U provided for each of the backlight units 10 through the bus line 22. In other words, individual control of the backlight unit 10 is performed by the drive unit U provided for each of the backlight units 10, 10, the whole control of the backlight 2 is performed by the external CPU 21.

According to the structure as described above, the external CPU 21 may only control the drive of the drive unit U provided for each of the backlight units 10, 10 so as to perform the drive control of the whole backlight 2.

Further, since the drive unit U is provided in each of the backlight units 10, 10, . . . , the external CPU 21 can similarly perform the drive control even when the backlight units 10, 10, . . . are changed in size or the backlight units 10, 10, . . . are replaced, for example.

Moreover, in the preferred embodiment, the external CPU 21 acquires the light quantity data of all the backlight units 10, 10, . . . from the drive units U, and obtains variations in brightness of the backlight units 10, 10, . . . so as to correct the variations in brightness of the respective backlight units 10, 10, . . . , to thereby prevent brightness unevenness from occurring in the backlight 2 even when the backlight 2 is constructed by combining the plurality of backlight units 10, 10, . . . .

Still further, there is an advantage that by providing the drive unit U in each backlight unit 10, the quantity of light of the light source 15 can be adjusted to a proper light quantity level in each drive unit U, based on the light quantity data detected by the detection means of the quantity of light of each of the drive units U.

Now, an example of a system for automatically correcting the brightness unevenness of the above-mentioned backlight 2 will be explained with reference to FIG. 12A and FIG. 12B.

In addition, it is assumed herein that an automatic correcting system is executed by the external CPU 21 at a predetermined timing, such as a timing when turning on a power supply etc.

For example, when the backlight 2 is formed by using the plurality of backlight units 10, 10, . . . , brightness unevenness also takes place in the whole backlight 2, because each of the backlight units 10, 10, . . . has different brightness.

For example, it is assumed that the backlight 2 is constructed by using backlight units 10, 10, . . . of m.times.n (where m and n are natural numbers).

For example, according to the light quantity data detected in the light quantity detector 34 of the drive unit U (mn) when all the backlight units 10, 10, . . . are turned on at 100% of brightness, it is further assumed that a backlight unit of a certain drive unit U (ab) has the maximum brightness, and a backlight unit of a certain drive unit U (cd) has the minimum brightness among the drive units −U (mn) of the backlight units 10, 10, . . . , where a≠c, b≠d, 0≦a, c≦m, 0≦b, d≦n.

Figure 12A:
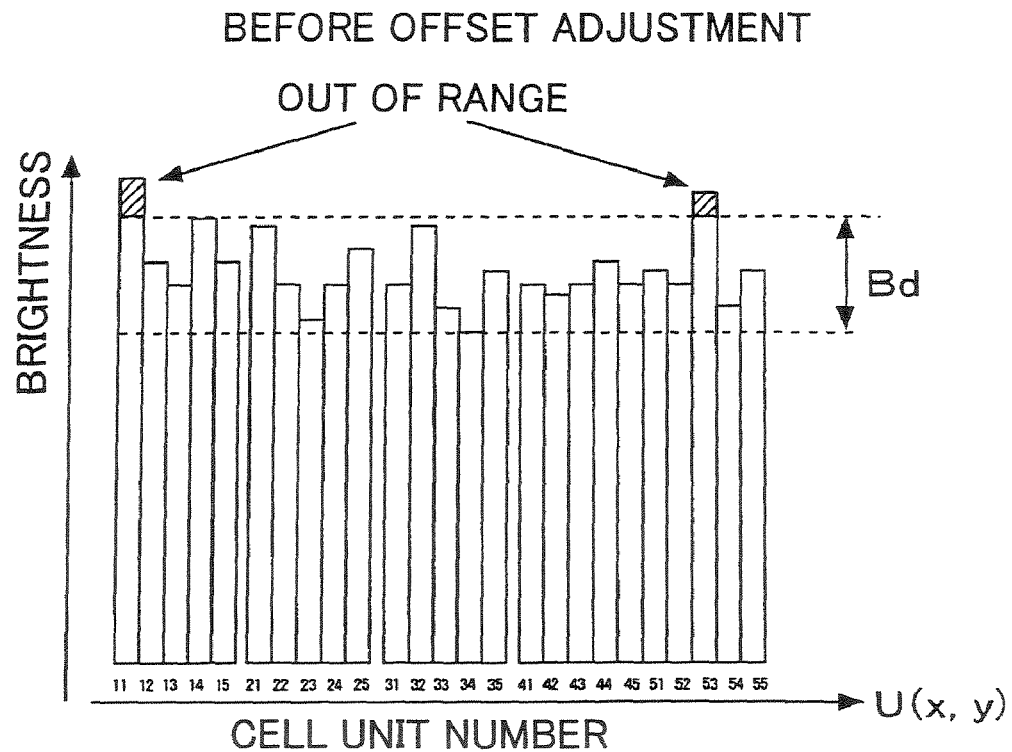
FIGS. 12A and 12B are views for explaining a system which corrects automatically brightness unevenness of the backlight of the first preferred embodiment.
Figure 12B:
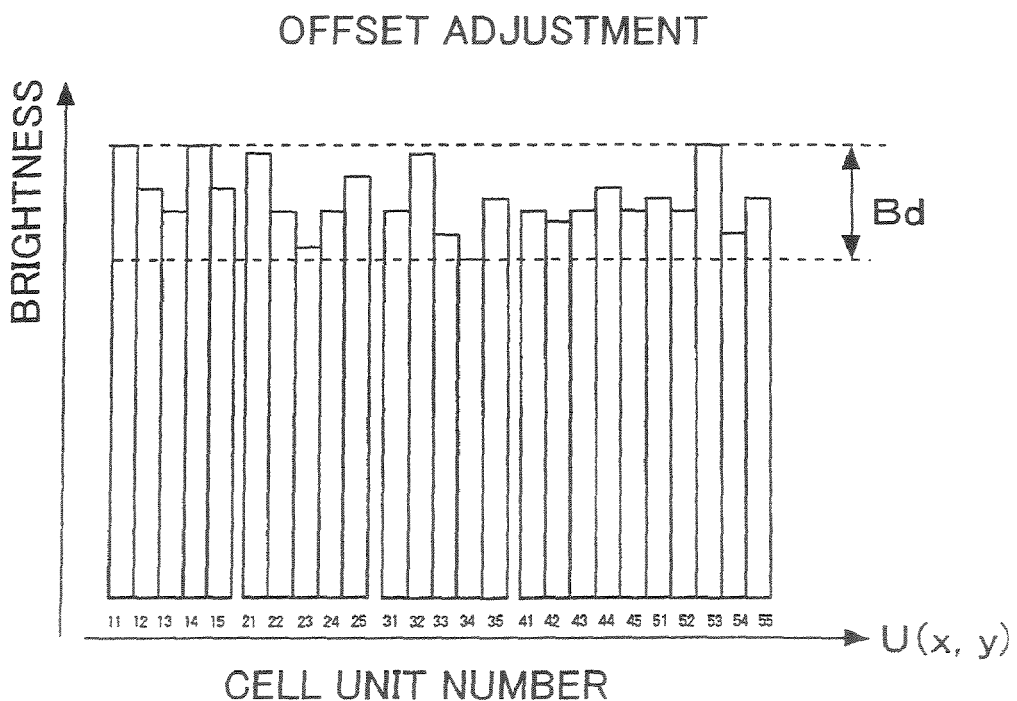

For example, when all the backlight units are turned on at 100% of brightness, it is assumed that maximum brightness is obtained in the backlight unit of the drive unit U (11), and the minimum brightness is obtained in the backlight unit of the drive unit U (34) as shown in FIG. 12A. Then, in this case, the quantities of light of the drive units U (11) and (53) which are away from a range of a brightness difference Bd set up based on the level of the minimum brightness are caused to be within the range of the brightness difference Bd, so as to correct the brightness unevenness of the backlight 2 as shown in FIG. 12B.

In addition, in this case, based on a level of the minimum brightness, the brightness difference Bd may be set within an arbitrary range, if it is within a limit in which the variations in brightness of the whole backlight 2 are not significant. For example, it is possible to set a range of the brightness difference Bd to "0", i.e., the brightnesses of all the backlight units 10, 10, . . . can be set to be equal. However, the highest brightness of the backlight 2 is always necessary to be in compliance with the minimum brightness level in the all backlight units 10, 10, . . . , which is somewhat disadvantageous in brightness.

Figure 13:
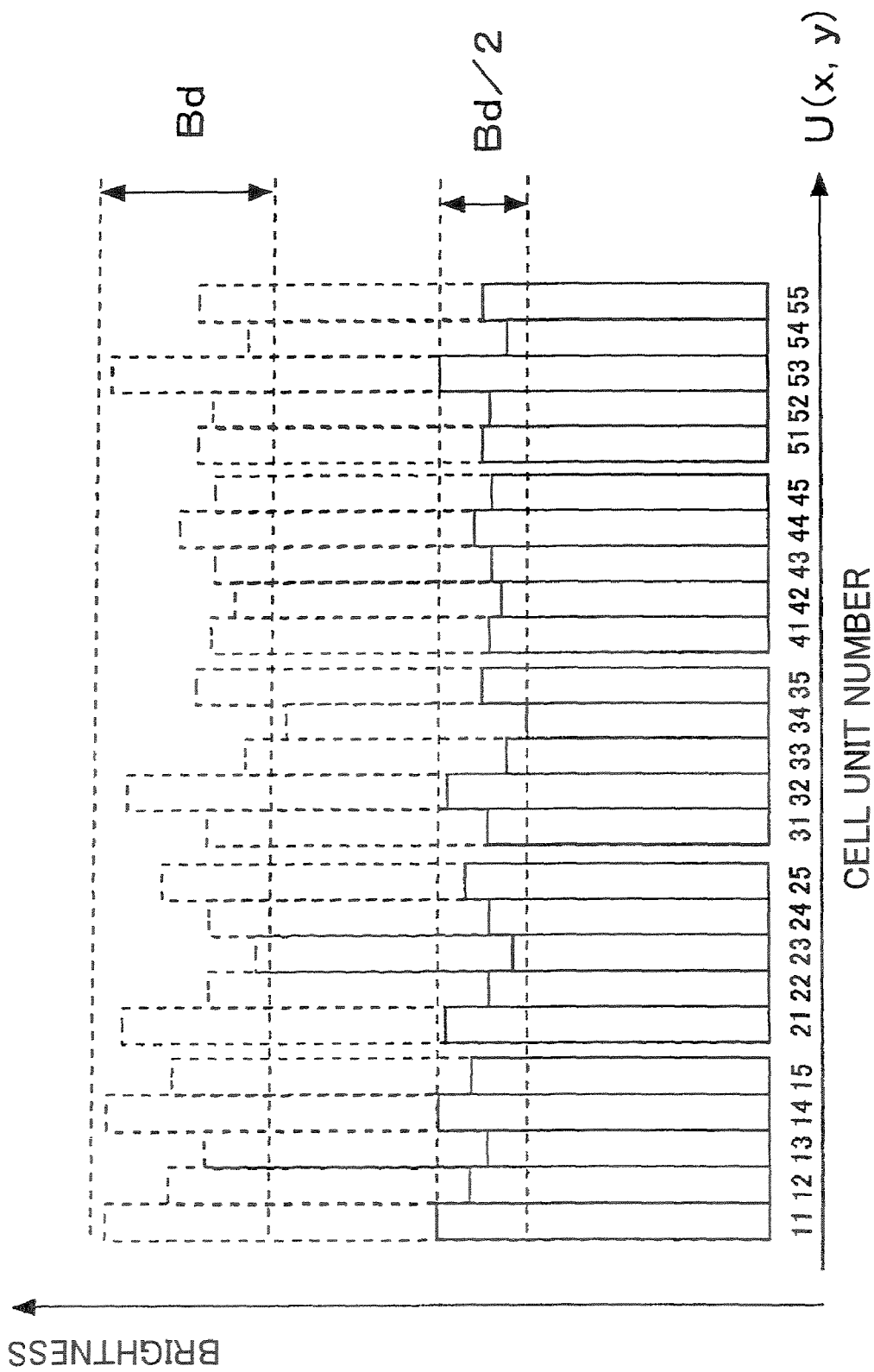
FIG. 13 is a graph for explaining a system which performs brightness control of the backlight of the first preferred embodiment.

Moreover, for example, when the brightness of the whole backlight 2 is caused to be 50% of the previous one according to a user's operation etc., if a command for changing the brightness and data about new brightness are transmitted from the external CPU 21 to the drive units U (mn) of all the backlight through the bus line 22, it becomes possible to reduce the brightness of the whole backlight 2 to 50%, as shown in FIG. 13.

Figure 15:
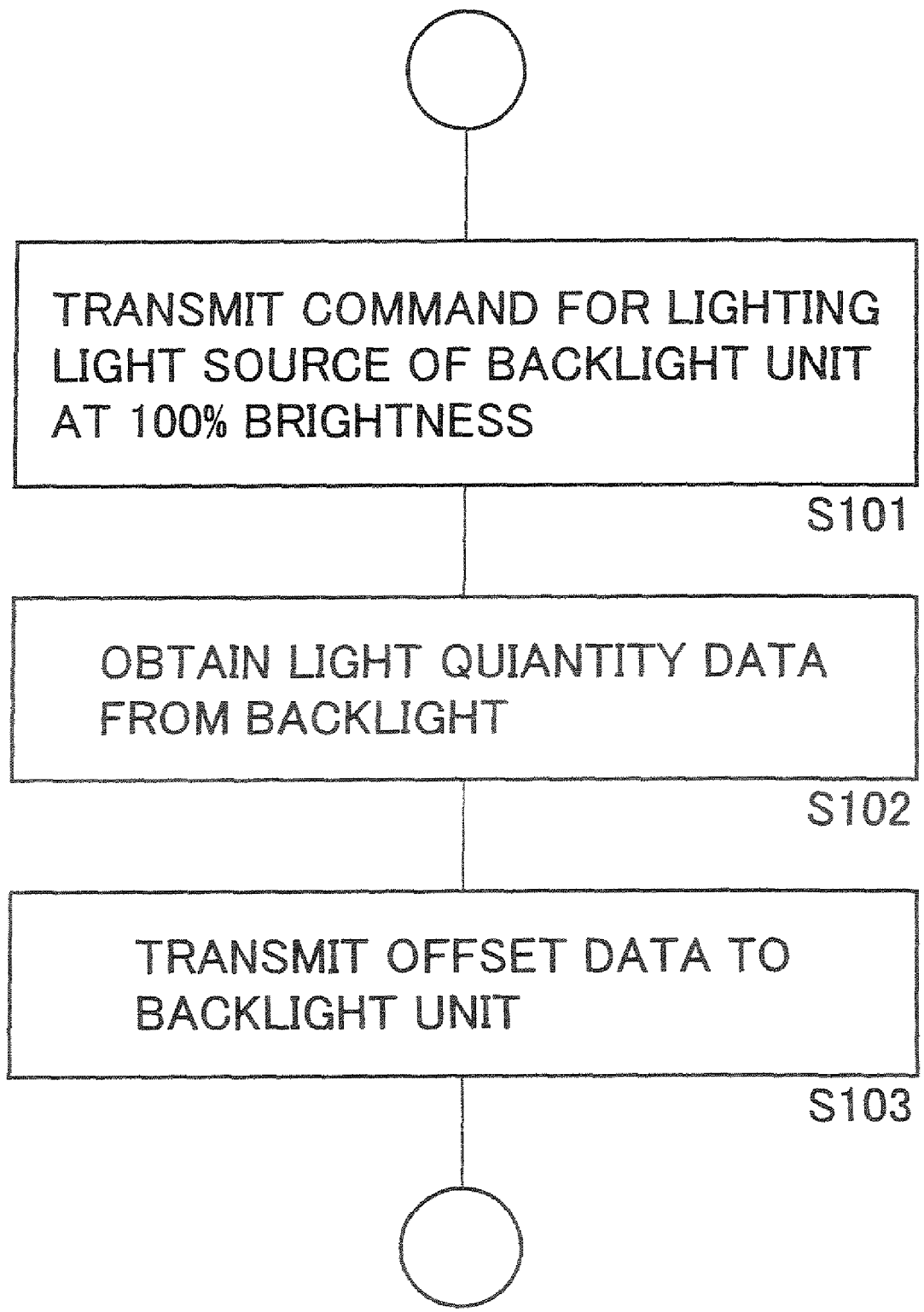
FIG. 15 is a flow chart showing a process performed by an external CPU for driving the backlight of the first preferred embodiment.

FIG. 15 is a flow chart showing a process in which the external CPU 21 operates the drive unit U for realizing a drive operation by means of a backlight drive apparatus such as described above.

In this case, firstly in step S101, the external CPU 21 transmits a command for causing light sources 15, 15, . . . of the respective backlight units 10, 10, . . . to be turned on at 100% of brightness, to the drive unit U of the backlight units 10, 10, . . . which constitute the backlight 2.

Next, in step S102 the drive unit U of each of the backlight units 10, 10, . . . is requested to provide the light quantity data detected by the light quantity detector 34 so as to acquire the light quantity data from each of the backlight units 10, 10, . . . .

Then in the subsequent step S103, as shown in FIG. 12A, a command for controlling the quantity of light is transmitted to the drive units U (11) and (53) of the backlights which are away from the range of the brightness difference Bd, out of the backlight units 10, 10, . . . , in order that the brightness difference unevenness of the backlight units 10, 10, . . . which form the backlight 2 may be inconspicuous. Thus, it becomes possible to correct the brightness unevenness of the whole backlight 2.

3. Backlight of Second Preferred Embodiment

Next, the backlight of a second preferred embodiment will be described.

FIG. 16 and FIG. 17A through FIG. 17C are views showing a structure of the backlight of the second preferred embodiment.

As shown in these FIG. 16, FIG. 17A through FIG. 17C, a backlight 40 of the second preferred embodiment forms the pair of units 10a by combining two backlight units 10, 10 in the same direction. Then, as shown, the lamp accommodation sections 11a of these pairs of units 10a are brought into contact with one another so as to form the backlight 40. In this case, therefore, the backlight 40 can be formed without arranging the pairs of units 10a in the alternate order.

Figure 17A:
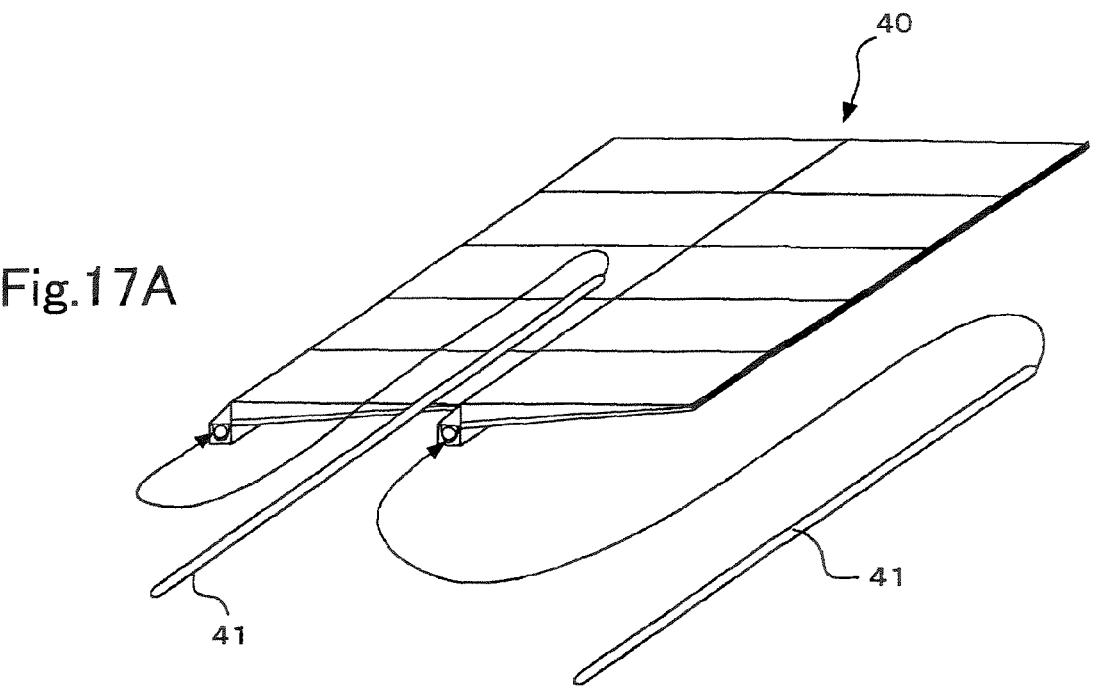
FIG. 17A through FIG. 17C are views showing a structure of the backlight units of the second preferred embodiment.
Figure 17B:
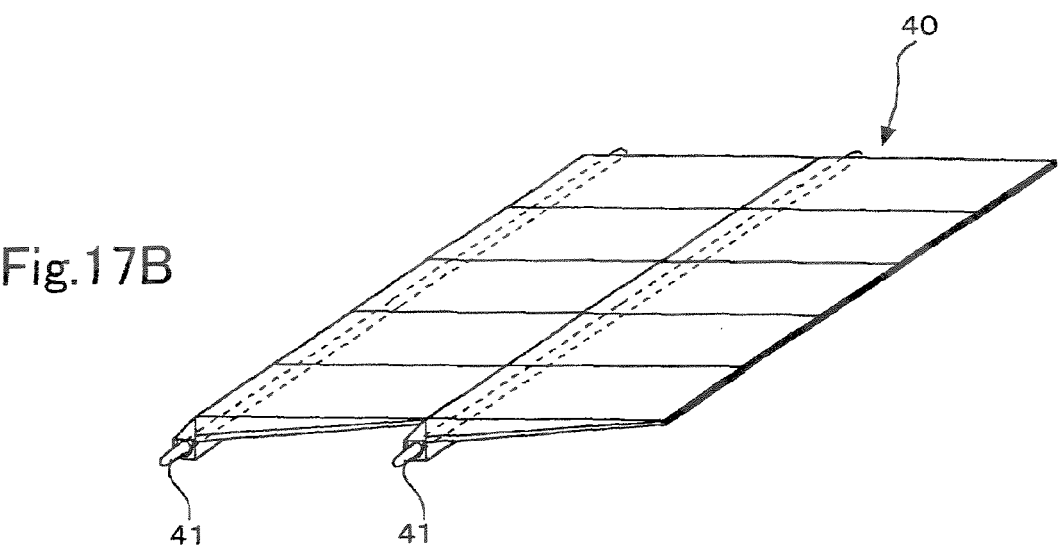
Figure 17C:
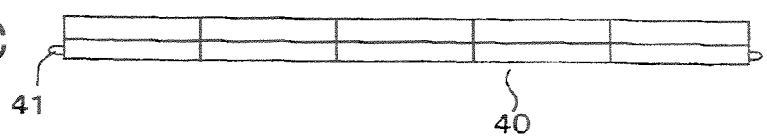

A light source 41 as shown in FIG. 17A through FIG. 17C is accommodated in the lamp accommodation section 11a of the thus formed backlight 40. In other words, in this case, a fluorescence tube which is sufficiently longer than the backlight unit 10 and longer than the lamp accommodation section 11a of the backlight 40 formed by combining the pair of units 10a is used as a light source 41, for example. In other words, in this case, the backlight 40 is formed by combining two composite boards, considering the light guide plates of five backlight units 10, 10, . . . as one composite board.

The above-mentioned drive apparatus for driving the backlight 40 will be described. In addition, since a structure of the drive unit U in this case is the same as that of FIG. 11 as shown above, detailed explanation will not be repeated.

Figure 18:
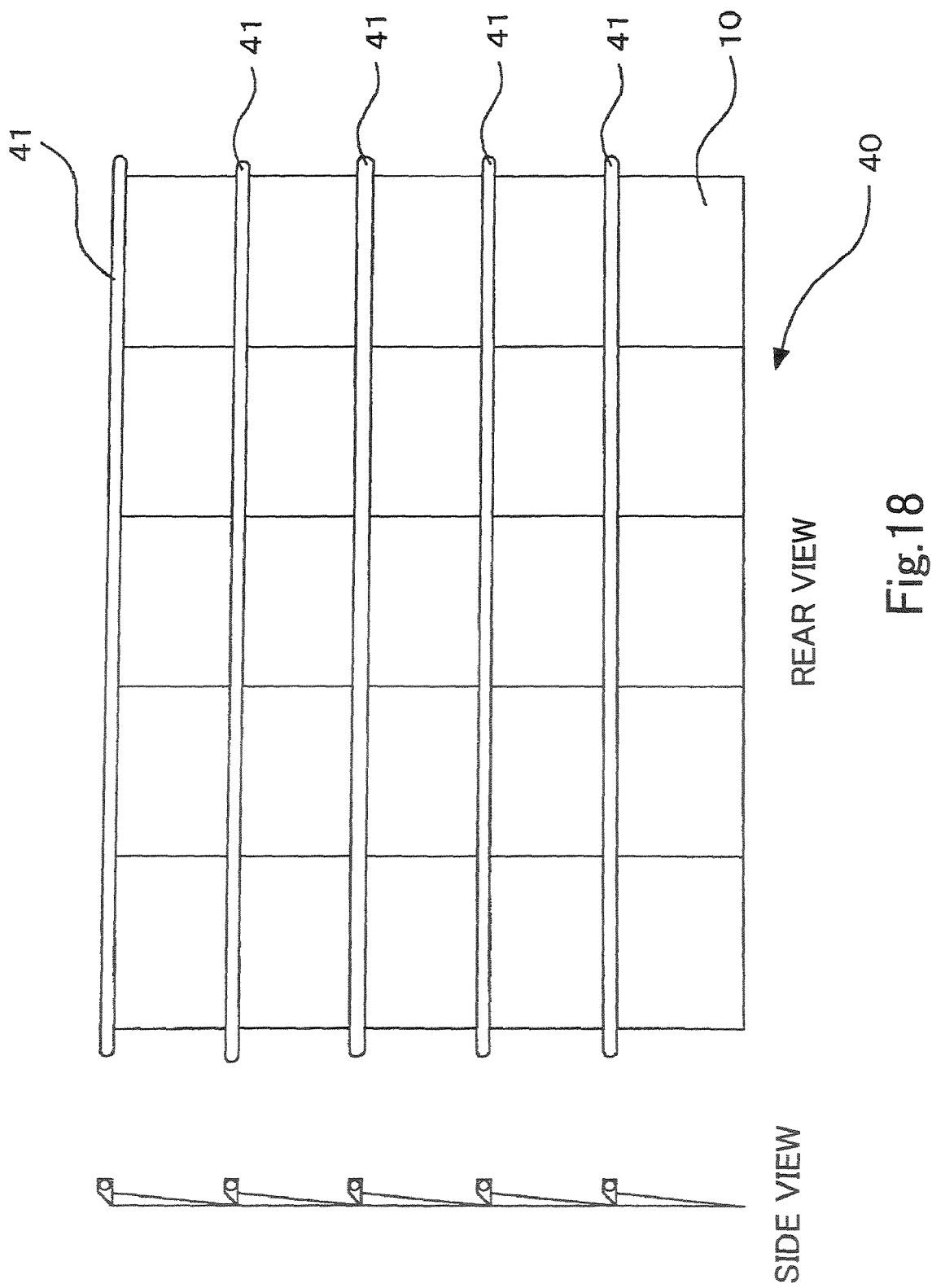
FIG. 18 show a rear view and a side view in which the whole backlight of the second preferred embodiment is constituted.

FIG. 18 are a rear view and a side view showing a structure of the above-mentioned backlight 40.

As can be seen from these FIG. 18, the fluorescence tube which is a light source 41 is formed over a plurality of the light guide plates 13 in the backlight 40.

Figure 19:
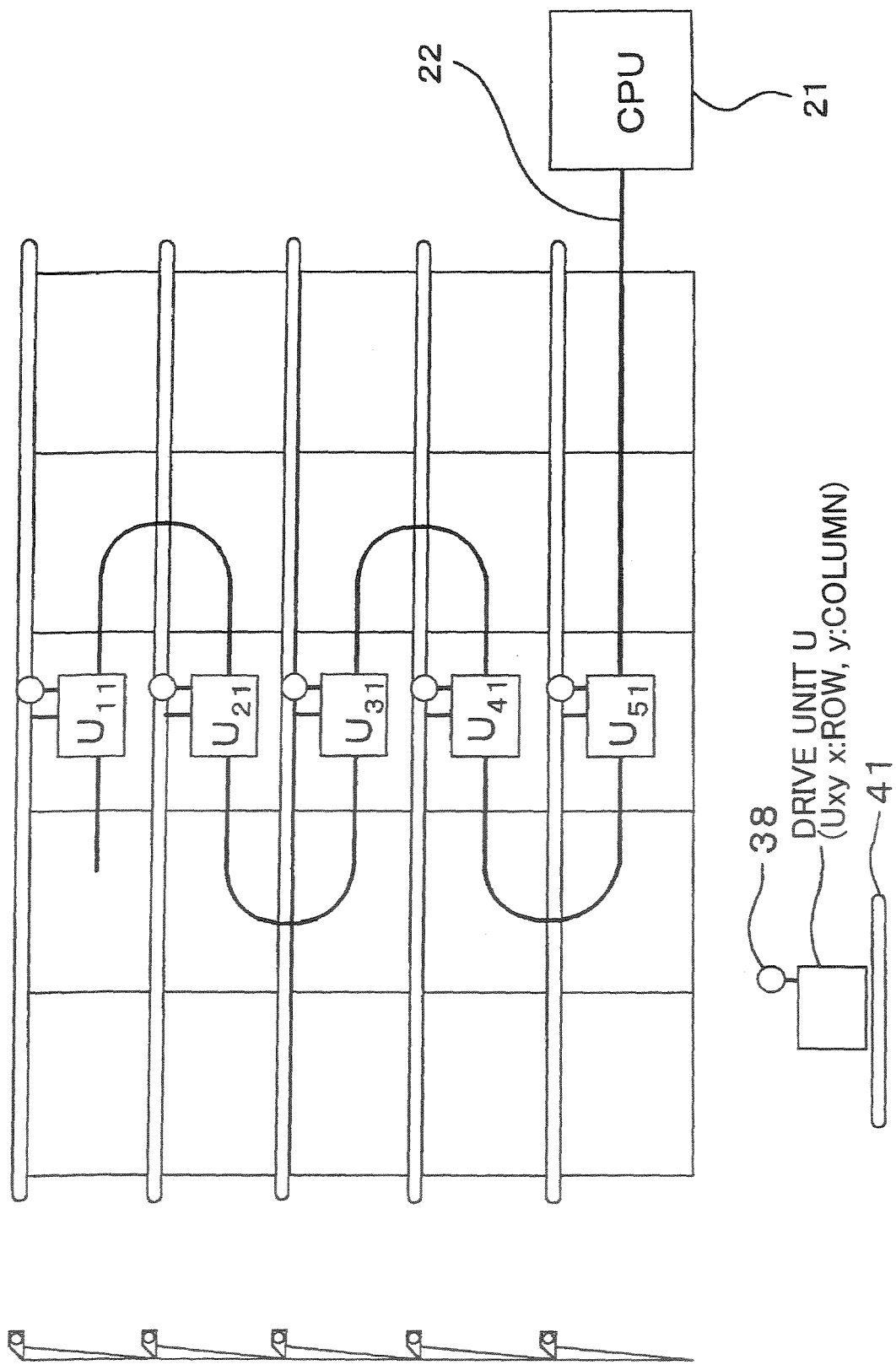
FIG. 19 show an example of a structure of the drive apparatus which drives the backlight of the second preferred embodiment.

A structure of the backlight drive apparatus which drives the above-mentioned backlight 40 is as shown in FIG. 19. That is, one drive unit Uxy (x: row, y: column) is formed for one light source 41, and the bus line 22 is connected between the drive unit Uxy and the external CPU 21. For example, these drive units Uxy are connected in the order of the drive units U11→U21→, . . . , →U51. The drive unit U51 is connected with the external CPU 21 as illustrated.

Even when the backlight 40 is formed providing the light source 41 over the plurality of backlight units 10, 10 in such a manner, the backlight 40 can be driven. Further, when it is constituted in such a manner, there is an advantage that fewer drive units U are needed, compared with a case where the backlight 2 of the above-mentioned first preferred embodiment is driven.

Further, in this case a length of the fluorescence tube which is the light source 41 is long, so that variations in the quantity of light arise as the fluorescence tube is degraded.

Figure 20:
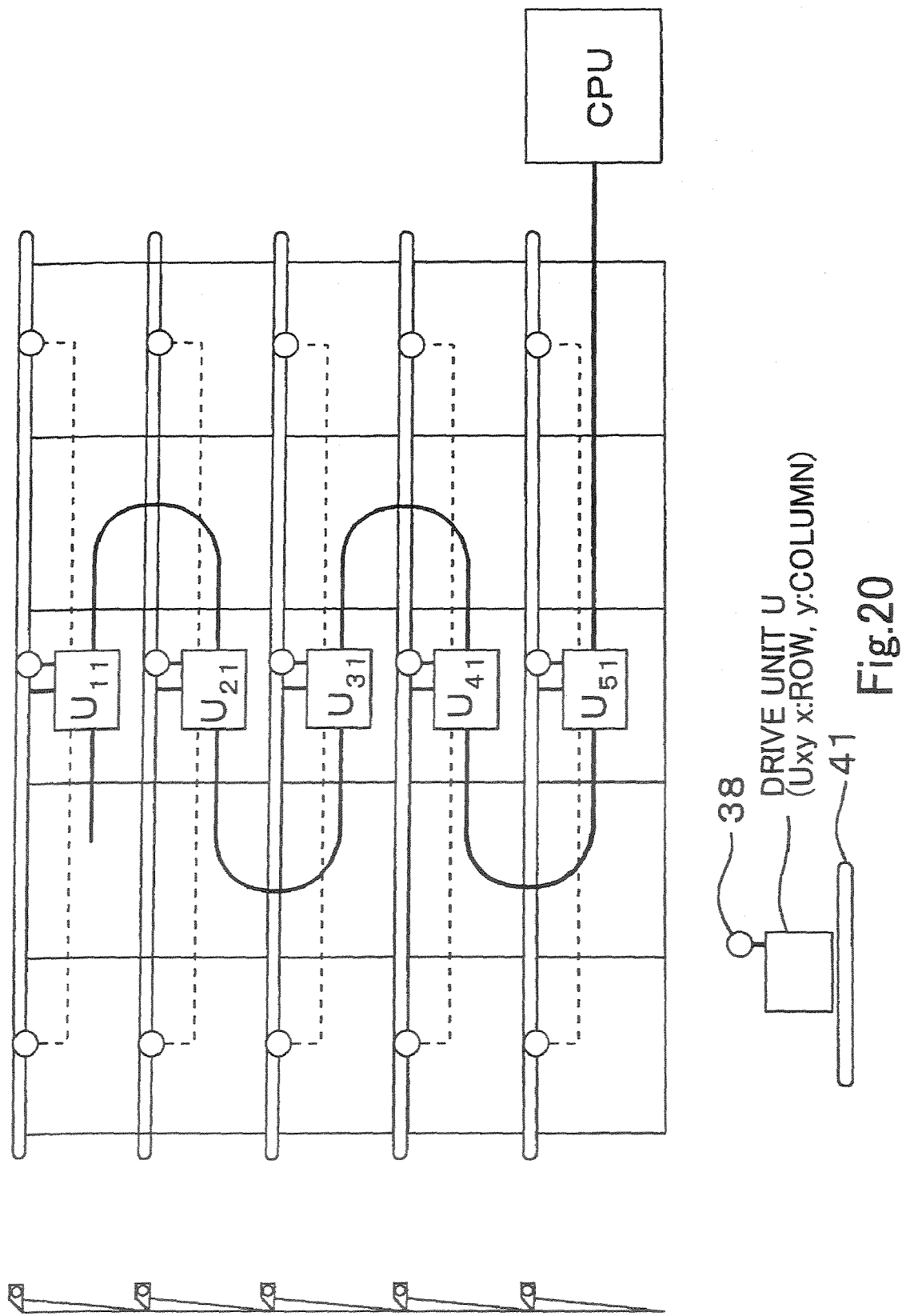
FIG. 20 are views showing another example of a structure of the drive apparatus which drives the backlight of the second preferred embodiment.

As shown in FIG. 20, in this case, the number of the light quantity detectors 34 can be increased which detect the variations in the quantity of light of the fluorescence tube in the drive unit U, to thereby detect the variations in the fluorescence tube which is a light source 41. In this way, since the brightness unevenness of the fluorescence tube itself which is the light source 41 is detectable, it becomes possible to provide function in which the external CPU 21 may know the time to replace the light source (fluorescence tube) 41, based on the brightness data sent from the drive unit U etc., and may prompt a user to replace the fluorescence tube.

4. Backlight of Third Preferred Embodiment

Next, the backlight of a third preferred embodiment will be described.

FIG. 21A, FIG. 21B, and FIG. 22A through FIG. 22C are views showing a structures of the backlight of the third preferred embodiment.

Figure 21A:
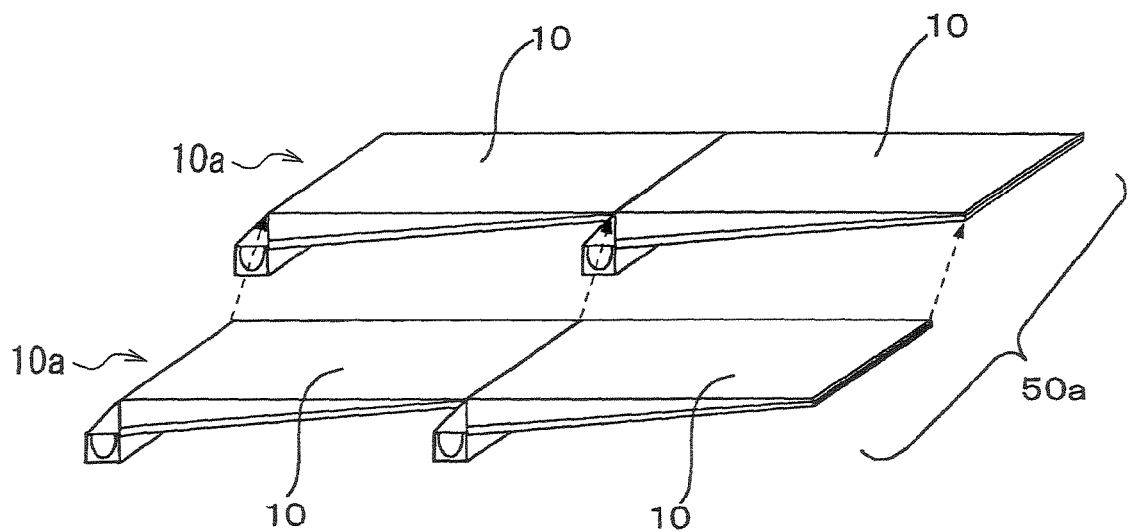
FIG. 21A and FIG. 21B are views showing an example of a combination of the backlight units which constitute the backlight of a third preferred embodiment.

As shown in these figures, similar to the above-mentioned backlight 40, a backlight 50 of the third preferred embodiment forms the pair of units 10a having combined two backlight units 10 and 10 in the same direction. Then, two pairs of units 10a, 10a are arranged so as to bring the lamp accommodation sections 11a into contact with each other, to thereby form a pair of units 50a which include four backlight units 10, 10, . . . as shown in FIG. 21A.

Figure 21B:
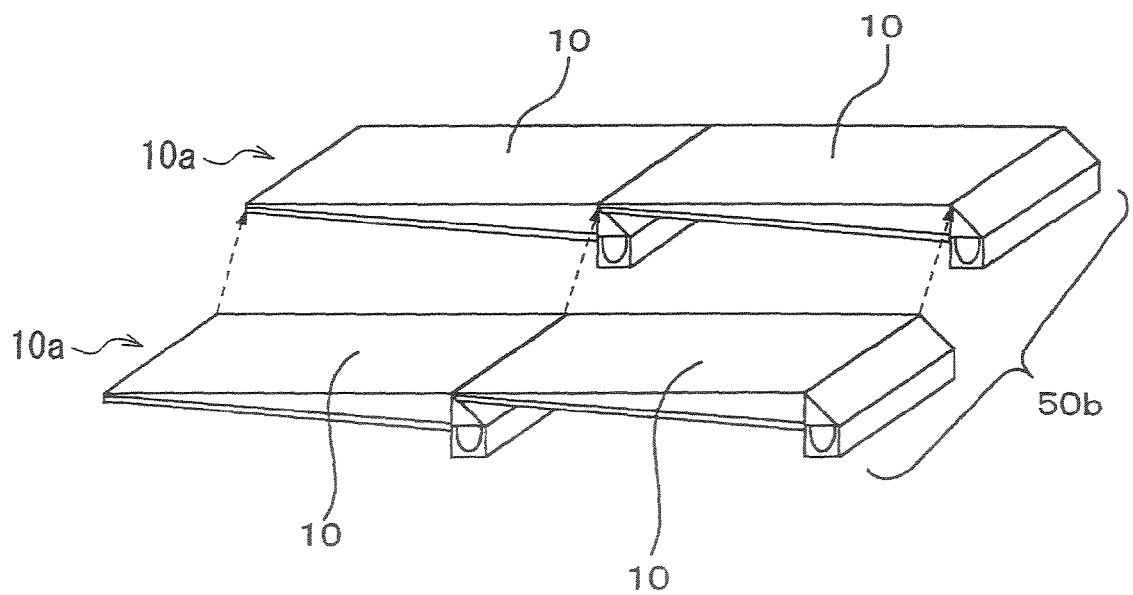

Similarly, a pair of units 50b in different directions by 180 degrees as shown in FIG. 21B is formed by combining four backlight units 10.

Figure 22A:
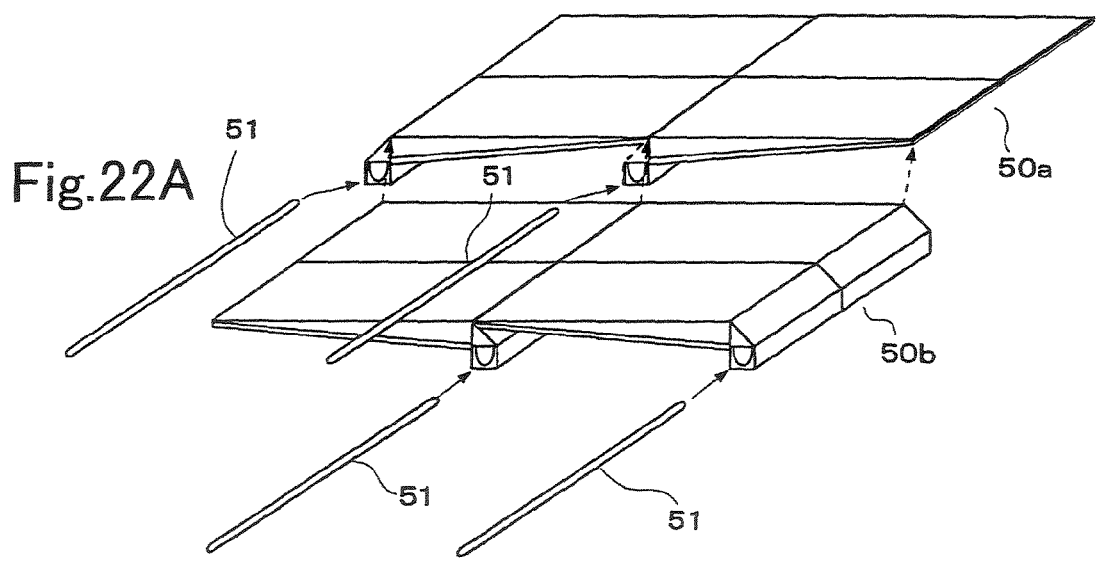
FIG. 22A through FIG. 22C are views showing a structure of the backlight units of the third preferred embodiment.
Figure 22B:
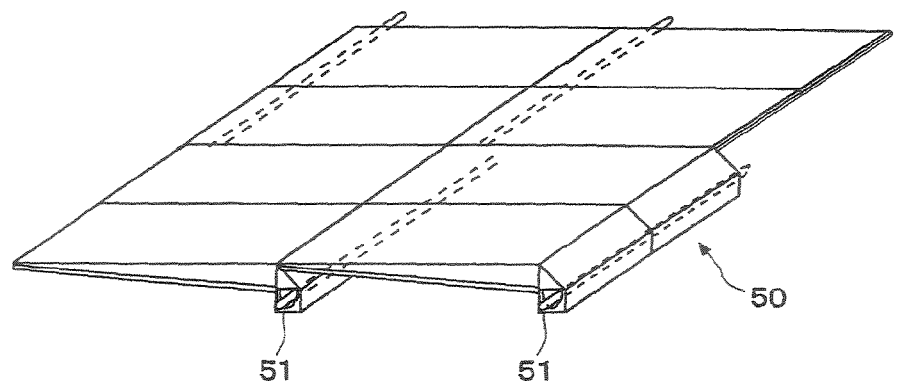
Figure 22C:

Considering these pairs of units 50a and 50b as one backlight unit, a fluorescence tube which substantially doubles the length of the backlight unit 10 is accommodated, as the light source 51, in the lamp accommodation section 11a of these pairs of units 50a and 50b as shown in FIG. 22A, so that the backlight 50 having a structure as shown in FIG. 22B is formed. Further, the back view of the backlight 50 in this case is as shown in FIG. 22C. That is, in this case, the light guide plates of four backlight units 10, 10, . . . are considered as one composite board, whereby the backlight 50 is formed by combining the composite boards.

Therefore, although not shown, as can be seen from the above description, the drive apparatus which drives the backlight 50 having such a structure can be constructed in such a manner that one drive unit Uxy (x: row, y: column) is provided for one light source 51 and the bus line 22 is connected between these drive units Uxy and the external CPU 21.

Further, as a modification of the backlight 50 as described above for example, it is also envisaged that the backlight may be constructed by composing one that is provided with the comparatively long light source (fluorescence tube) 51, considering the light guide plates of two backlight units 10, 10 as one composite board, and one that is provided with the light source (fluorescence tube) 15 for each backlight unit 10.

Figure 23:
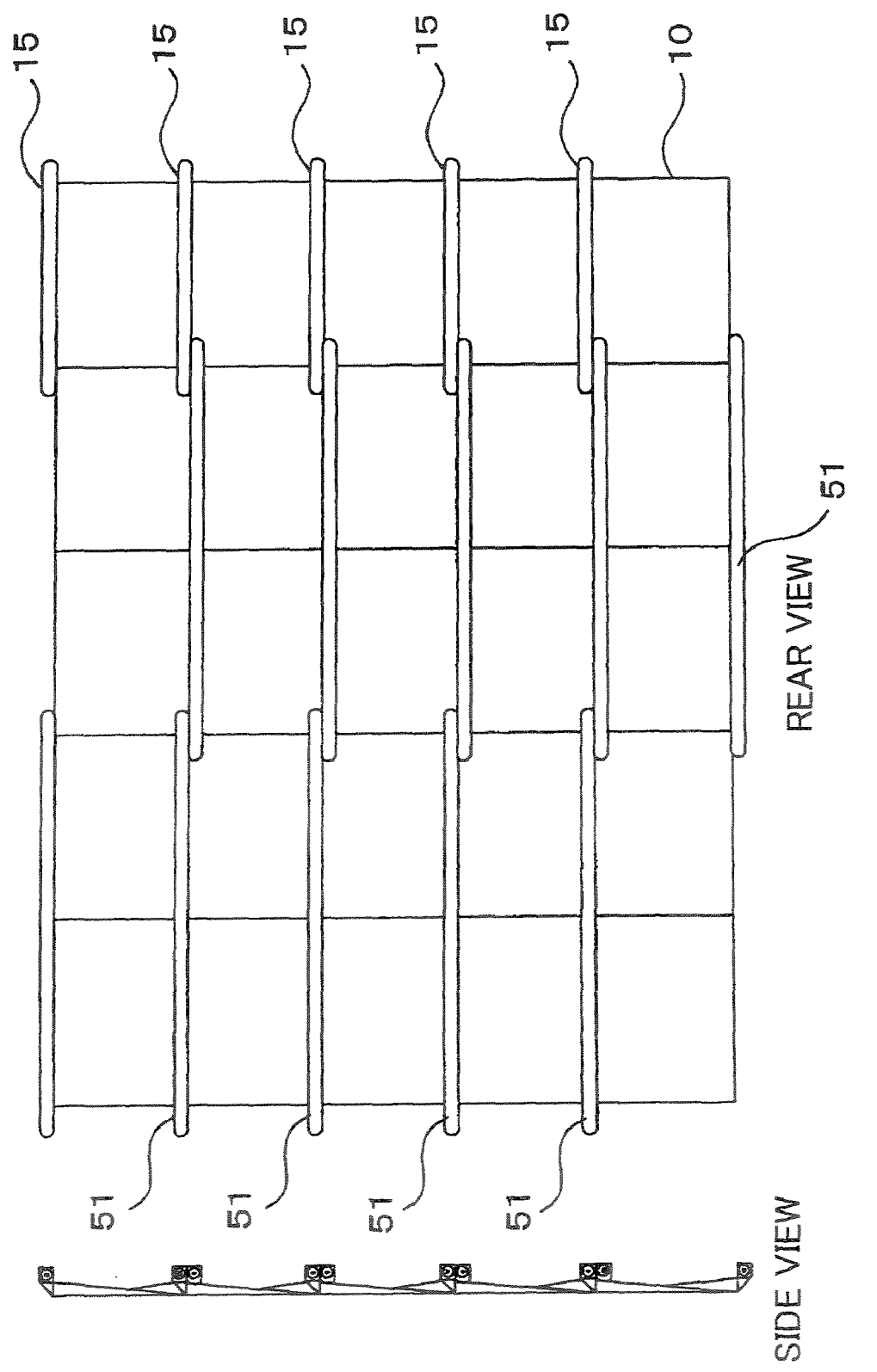
FIG. 23 show a rear view and a side view in which the whole backlight of the third preferred embodiment is constituted.

Then, the rear view and the side view of the backlight in that case are as shown in FIG. 23.

Figure 24:
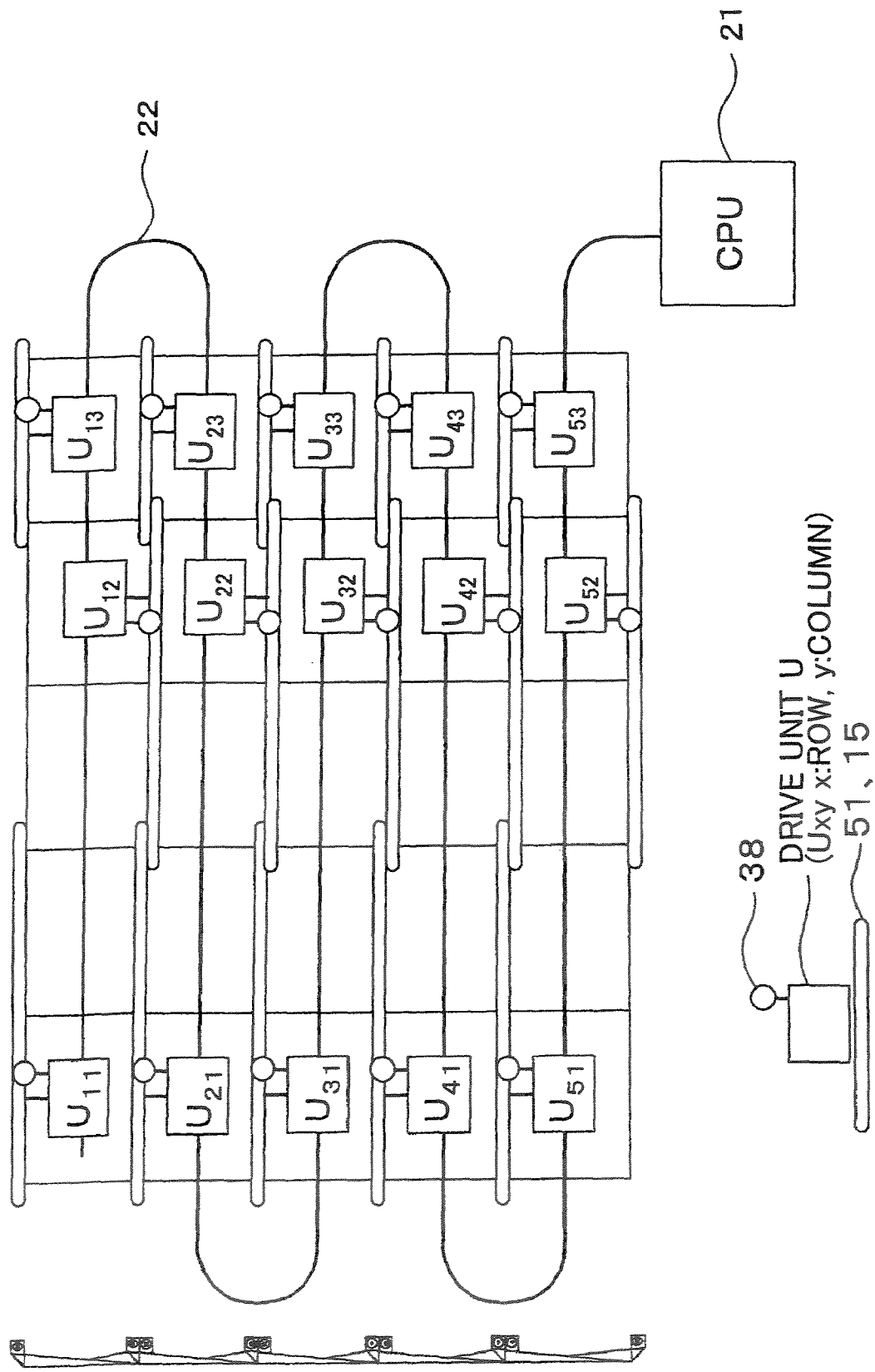
FIG. 24 are views showing an example of a structure of the drive apparatus for driving the backlight of the third preferred embodiment.

Further, the structure of the backlight drive apparatus which drives such a backlight is as shown in FIG. 23 and FIG. 24.

In this case, one drive unit Uxy (x: row, y: column) is provided for each of the light sources 51 and the light sources 15. The bus line 22 is connected between these drive units Uxy and the external CPU 21. In FIG. 24, the drive units Uxy are connected in the order of the drive units U1→U12→U13→U23, . . . , →U21→U31→U33, . . . , →U53, so that the drive unit U53 is connected with the external CPU 21. In this way, even when the backlight is constructed by composing the light sources 51 and 15 which are different in length, the drive unit U can control them.

Figure 25:
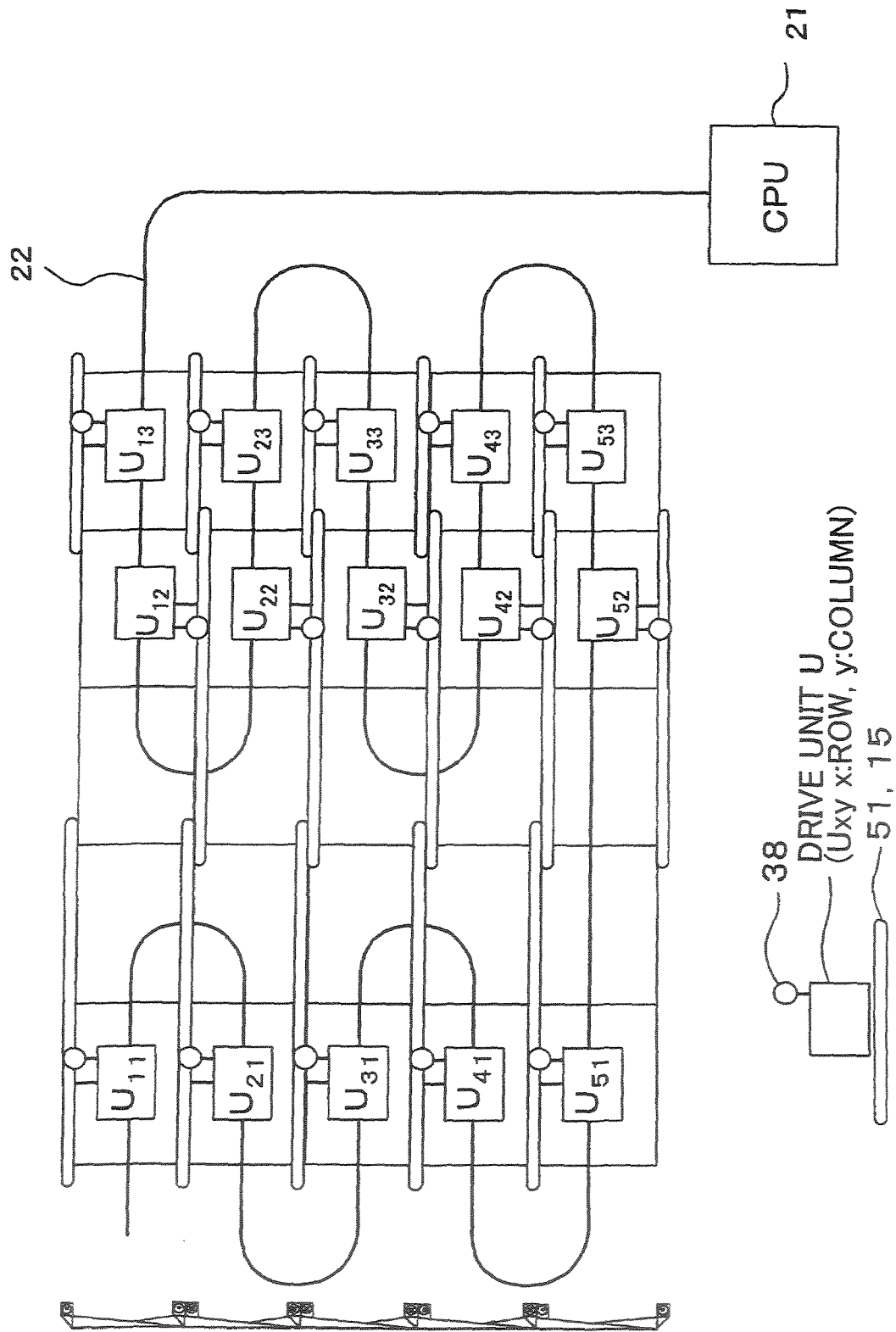
FIG. 25 are views showing another example of a structure of the drive apparatus for driving the backlight of the third preferred embodiment.

Further, another example of connection of the bus line 22 is shown in FIG. 25.

In this case, the drive units Uxy are connected in the order of the drive unit U11→U21→, . . . , U52→U53→U43→U42.→, . . . , →U13, so that the drive unit U13 is connected with the external CPU 21. In this case, even when the backlight is constructed by composing the light sources 51 and 15 having different lengths, the drive unit U can control them.

In addition, the structure of the backlight of this preferred embodiment as described above is merely by way of example, the backlight in accordance with the present invention need only be formed in such a way that the backlight for illuminating, from the back, the liquid crystal panel which is constituted by at least a single panel is formed by the plurality of backlight units.

Further, the liquid crystal panel of the liquid crystal display apparatus of the present invention may be constructed by using one or a plurality of liquid crystal panels.

Moreover, although in the backlight unit of the preferred embodiment the light source unit 11 is disposed at the back of the light guide plate 13 by using the reflective prism, this is merely an example. Another structure of the backlight unit may be envisaged which is applicable to the backlight of the present invention.

For example, as shown in FIG. 26A, it can be constructed by using a backlight unit 70 in which a light source unit 71 is disposed at a side of the wedge-shaped light guide plate 13, or a backlight unit 72 in which the light source unit 71 are disposed at one side or both sides of a planar light guide plate 73 as shown in FIG. 26B.

Figure 27A:
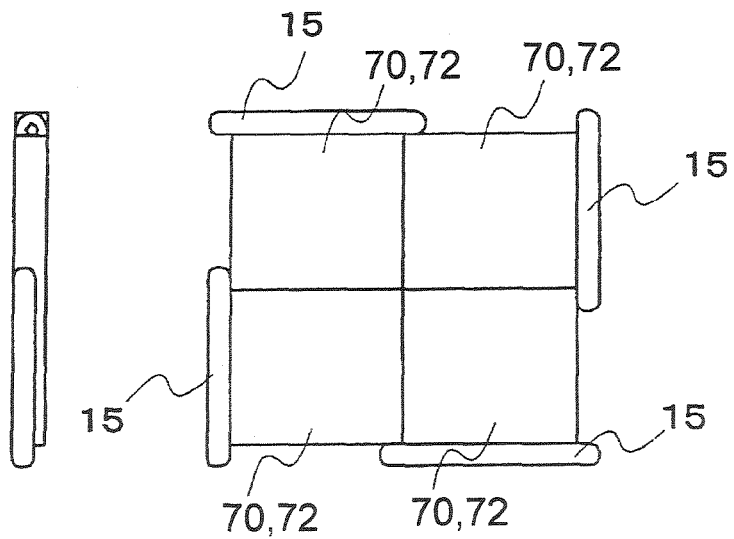
FIG. 27A and FIG. 27B are examples of structures of the backlight using the backlight units as shown in FIGS. 26A and 26B.
Figure 27B:
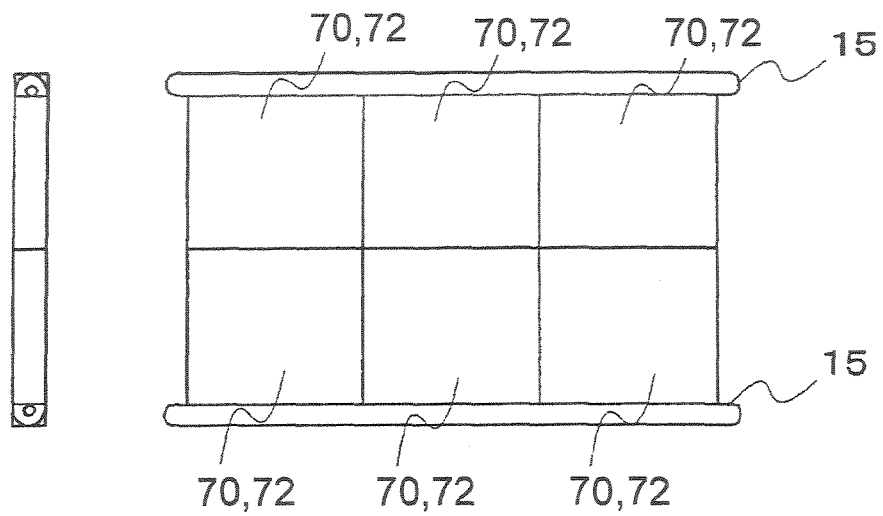

However, when the backlight is constructed by combining the backlight units 70 and 72 having the structure as shown in FIG. 26A and FIG. 26B, it is constructed by combining four sheets of the backlight units 70 and 72 in the directions as shown in FIG. 27A, for example. Alternatively, after combining them as shown in FIG. 27B, it can be realized only when a long fluorescence tube is commonly used as the fluorescence tube of the backlight 70 and 72 in the same direction.

As described above, with respect to the backlight of the present invention, the lighting side which illuminates the back of the video display unit formed by the single panel is formed by combining the plurality of backlight units in the planar shape, so that the backlight of the edge light system which can illuminate the video display unit of large area uniformly and more with high brightness can be realized.

Further, according to the present invention, it is not necessary to arrange a lot of fluorescence tubes on a side edge of one light guide plate, for example, in order to attain the backlight of high brightness, whereby, there is no need to thicken the acrylic resin which forms the light guide plate, and the weight saving of the backlight can be attained.

Therefore, when the liquid crystal display apparatus, for example, is formed by using the backlight of the present invention, a display apparatus which is unprecedentedly large-sized, reducing weight can be realized.

When the diffusion board is arranged in the position apart from the backlight and between the backlight and the video display units, brightness unevenness at a junction section of the backlight unit can be inconspicuous.

Further, in the drive apparatus for the backlight of the present invention, the backlight units which constitute the backlight are respectively driven by means of the drive units, and the drive control unit controls the backlight unit, to thereby control the whole backlight.

The invention claimed is:

1. A drive apparatus for a backlight formed by combining a plurality of backlight units and a plurality of light sources, said drive apparatus comprising:
a plurality of drive units, a respective drive unit being provided for a respective light source and configured to perform drive control of the respective light source, said plurality of backlight units being arrayed in a plurality of rows in a plane that extends behind and parallel to a video display unit formed by a single panel so as to illuminate a back of the video display unit, each of the plurality of light sources extending through at least one of the plurality of backlight units, the plurality of backlight units being arrayed in two directions so as to be arranged in the plurality of rows and a plurality of columns that extend behind and parallel to the video display unit formed by the single panel, backlight units in adjacent columns being oriented in different directions which differ from one another by 180 degrees, each backlight unit including a reflective prism, a light guide plate, and a condensing processed surface, each light source including protruding portions which protrude from opposite sides of a corresponding one of the backlight units, at least one of the protruding portions extending beneath a portion of an adjacent backlight unit in an adjacent column; and
a drive control unit configured to perform drive control of said drive units, said plurality of drive units and said drive control unit being connected in a daisy chain.

2. The drive apparatus for the backlight as described in claim 1, wherein said drive unit comprises a light quantity detector configured to detect a light quantity of a light source of said respective backlight unit, and a light quantity control unit which controls the light quantity of said light source to a predetermined level based on a result of said detected light quantity of said light quantity detector.

3. The drive apparatus for the backlight as described in claim 2, wherein a plurality of said light quantity detectors are provided.

4. The drive apparatus for the backlight as described in claim 2, wherein said light quantity control unit is configured to control a light quantity of said light source to a predetermined level by varying a duty ratio of a drive voltage supplied to said light source based on the result of said detected light quantity of said light quantity detector.

5. The drive apparatus for the backlight as described in claim 1, wherein said drive unit includes a temperature sensor configured to detect a temperature of said light source.

6. The drive apparatus for the backlight as described in claim 1, wherein said drive control unit is configured to generate and transmit an offset data which offsets the light quantity at said drive units, based on a light quantity data transmitted from said plurality of drive units.

7. The drive apparatus for the backlight as described in claim 6, wherein said drive unit variably controls voltage level of a light source drive voltage supplied to said light source so that the light quantity of said light source is set to a predetermined level, the predetermined level based on said offset data transmitted from said drive control unit.

8. The drive apparatus for the backlight as described in claim 6, wherein said drive unit variably controls current flowing through said light source so that the light quantity of said light source is set to a predetermined level, the predetermined level based on said offset data transmitted from said drive control unit.

9. The drive apparatus for the backlight as described in claim 1, wherein at least two backlight units share a single one of the plurality of light sources.

* * * * *